US012661628B2

(12) United States Patent
Hansen et al.

(10) Patent No.: US 12,661,628 B2
(45) Date of Patent: Jun. 23, 2026

(54) STRUCTURED BODY FOR HEATING GAS

(71) Applicant: Topsoe A/S, Kgs. Lyngby (DK)

(72) Inventors: Anders Helbo Hansen, Espergaerde (DK); Peter Mølgaard Mortensen, Roskilde (DK); Sebastian Thor Wismann, Charlottenlund (DK)

(73) Assignee: TOPSOE A/S, Kgs. Lyngby (DK)

( * ) Notice: Subject to any disclaimer, the term of this patent is extended or adjusted under 35 U.S.C. 154(b) by 455 days.

(21) Appl. No.: 18/565,627

(22) PCT Filed: Jun. 27, 2022

(86) PCT No.: PCT/EP2022/067532
§ 371 (c)(1),
(2) Date: Nov. 30, 2023

(87) PCT Pub. No.: WO2023/274938
PCT Pub. Date: Jan. 5, 2023

(65) Prior Publication Data
US 2024/0367134 A1    Nov. 7, 2024

(30) Foreign Application Priority Data

Jun. 28, 2021    (EP) ..................................... 21182135

(51) Int. Cl.
| | |
|---|---|
| *B01J 19/00* | (2006.01) |
| *B01J 19/24* | (2006.01) |
| *B33Y 80/00* | (2015.01) |
| *C01B 3/047* | (2026.01) |
| *C01B 3/16* | (2006.01) |
| *C01B 3/22* | (2006.01) |
| *C01B 3/382* | (2026.01) |
| *C01C 3/02* | (2006.01) |
| *F24H 3/04* | (2022.01) |
| *F24H 9/00* | (2022.01) |
| *H05B 3/12* | (2006.01) |
| *H05B 3/42* | (2006.01) |

(52) U.S. Cl.
CPC ....... *B01J 19/0013* (2013.01); *B01J 19/2485* (2013.01); *F24H 3/0405* (2013.01); *F24H 9/0063* (2013.01); *H05B 3/12* (2013.01); *B01J 2219/0015* (2013.01); *B01J 2219/2416* (2013.01); *B01J 2219/2419* (2013.01); *B01J 2219/2428* (2013.01); *F24H 2250/02* (2013.01); *H05B 2203/022* (2013.01)

(58) Field of Classification Search
CPC ............... B01J 19/0006; B01J 19/0013; B01J 19/2485; F24H 3/0405; F24H 9/0063; H05B 3/12
See application file for complete search history.

(56) References Cited

U.S. PATENT DOCUMENTS

| | | | |
|---|---|---|---|
| 2003/0044331 A1 | 3/2003 | DeBellis | |
| 2010/0158769 A1 | 6/2010 | Lee | |
| 2018/0093886 A1 | 4/2018 | Kado et al. | |
| 2021/0113983 A1* | 4/2021 | Mortensen ............. B01J 12/007 |

FOREIGN PATENT DOCUMENTS

| | | |
|---|---|---|
| AU | 698930 B2 | 11/1998 |
| EP | 0450872 A1 | 10/1991 |
| EP | 2181755 A2 | 5/2010 |
| WO | 2019110267 A1 | 6/2019 |
| WO | 2019/228795 A1 | 12/2019 |
| WO | 2019/228798 A1 | 12/2019 |
| WO | 2021/110810 A1 | 6/2021 |
| WO | 2021110826 A1 | 6/2021 |

OTHER PUBLICATIONS

International Search Report and Written Opinion mailed on Oct. 7, 2022, by the European Patent Office for International Application No. PCT/EP2022/067532, 13 pages.
European Search Report mailed on Dec. 20, 2021, by the European Patent Office for European Application No. 21182135.0, 6 pages.
U.S. Appl. No. 18/565,902, Peter Mølgaard Mortensen, filed Nov. 30, 2023.
U.S. Appl. No. 18/001,274, Peter Mølgaard Mortensen, filed Dec. 9, 2022.
EP Communication dated Nov. 25, 2020 and EP Search Report dated Nov. 3, 2020 issued in corresponding European Patent Application No. 20187305.6. (5 pages).
European Search Report mailed on Nov. 29, 2021, by the European Patent Office for European Application No. EP21182136.
Intention to grant received for European Application No. 21745761. 3, mailed on Nov. 21, 2023, 6 pages.
International Preliminary Report on Patentability received for PCT Patent Application No. PCT/EP21/069716, mailed on Feb. 2, 2023, 7 pages.
International Search Report and Written Opinion mailed on Dec. 10, 2022 by the European Patent Office for International Application No. PCT/EP2022/067534.
International Search Report and Written Opinion received for PCT Patent Application No. PCT/EP2021/069716, mailed on Aug. 30, 2021, 9 pages.
Kee Robert J et al: "Process intensification in the catalytic conversion of natural gas to fuels and chemicals", Proceedings of the Combustion Institute, vol. 36, No. 1, Jun. 16, 2016, pp. 51-76.

* cited by examiner

*Primary Examiner* — Yong L Chu

(74) *Attorney, Agent, or Firm* — Boone IP Law

(57) ABSTRACT

A structured body for heating system for carrying out heating of a pressurized feed gas is provided, where the heat is provided by resistance heating by means of electrical power.

19 Claims, 9 Drawing Sheets

STRUCTURED BODY FOR HEATING GAS

TECHNICAL FIELD

A structured body for a heating system for carrying out heating of a pressurized feed gas is provided, where the heat is provided by resistance heating.

BACKGROUND

Typically, gas heat exchangers are limited in design temperature, as they are also pressure baring equipment, which typically limits the maximum operating temperature of these. A classical configuration of heat exchange is the tube and shell type, where one gas flowing on the tube side heat exchanges with another gas on the shell side to thereby heat the first gas and cool the second gas, or vice versa. It is desirable to develop a heating system, specifically a gas preheater, which allows for heating gas systems to very high temperatures. It is also desirable to develop a heating system which is compact and simple to operate. Another advantage of the present technology is that the overall emission of carbon dioxide and other emissions detrimental to the climate may be reduced considerably, in particular if the power used in the heating system is from renewable energy resources.

Preheating of gas is needed in many aspects of chemical process design. Examples of gas preheaters includes preheating for reduction gas used for activation of catalyst beds. Another use of a gas preheater is the example of a $CO_2$ preheater to an Adiabatic POst Convertor (APOC). The APOC reactor is described in WO 2019/110267. In both cases, it can be desirable to have a very high gas preheating temperature to enable the interplay of the downstream unit operation.

SUMMARY

The present technology thus provides a structured body arranged for heating a feed gas, said structured body comprising a first macroscopic structure and a second macroscopic structure, each extending in a longitudinal direction from a first end to a second end, where said first end forms an inlet to said first and second macroscopic structures for said feed gas and said second end forms an outlet for heated gas, said first and second macroscopic structure comprising a three-dimensional network structure, wherein the network structure forms flow paths allowing the feed gas to flow from said first end to said second end, the network structure being formed by a metallic material being electrically conductive, wherein the second macroscopic structure is arranged at least partly circumferentially around the first macroscopic structure, and wherein the first and second macroscopic structures are electrically connected at the second end.

Additionally, the present technology provides a heating system for heating of a feed gas, said heating system comprising:

a) a structured body as described herein;

b) a pressure shell housing said structured body, said pressure shell comprising an inlet for letting in said feed gas and an outlet for letting out heated gas, wherein said inlet is positioned so that said feed gas enters said structured body in a first end and said heated gas exits said body from a second end; and c) a heat insulation layer between said structured body and said pressure shell.

Additionally, the present technology provides a process for heating a feed gas in a heating system as described herein; said process comprising the steps of:

pressurizing said feed gas, supplying said pressurized feed gas to the heating system, supplying electrical power via electrical conductors connecting an electrical power supply placed outside said pressure shell to said structured body, allowing an electrical current to run through said electrically conductive material, thereby heating at least part of the structured body, heating the feed gas over the structured body and outletting a heated gas from the heating system.

Additional aspects of the present technology are set out in the dependent claims, the figures and the following description text.

LEGENDS TO THE FIGURES

DETAILED DISCLOSURE

Specific Embodiments

Figure 1A:
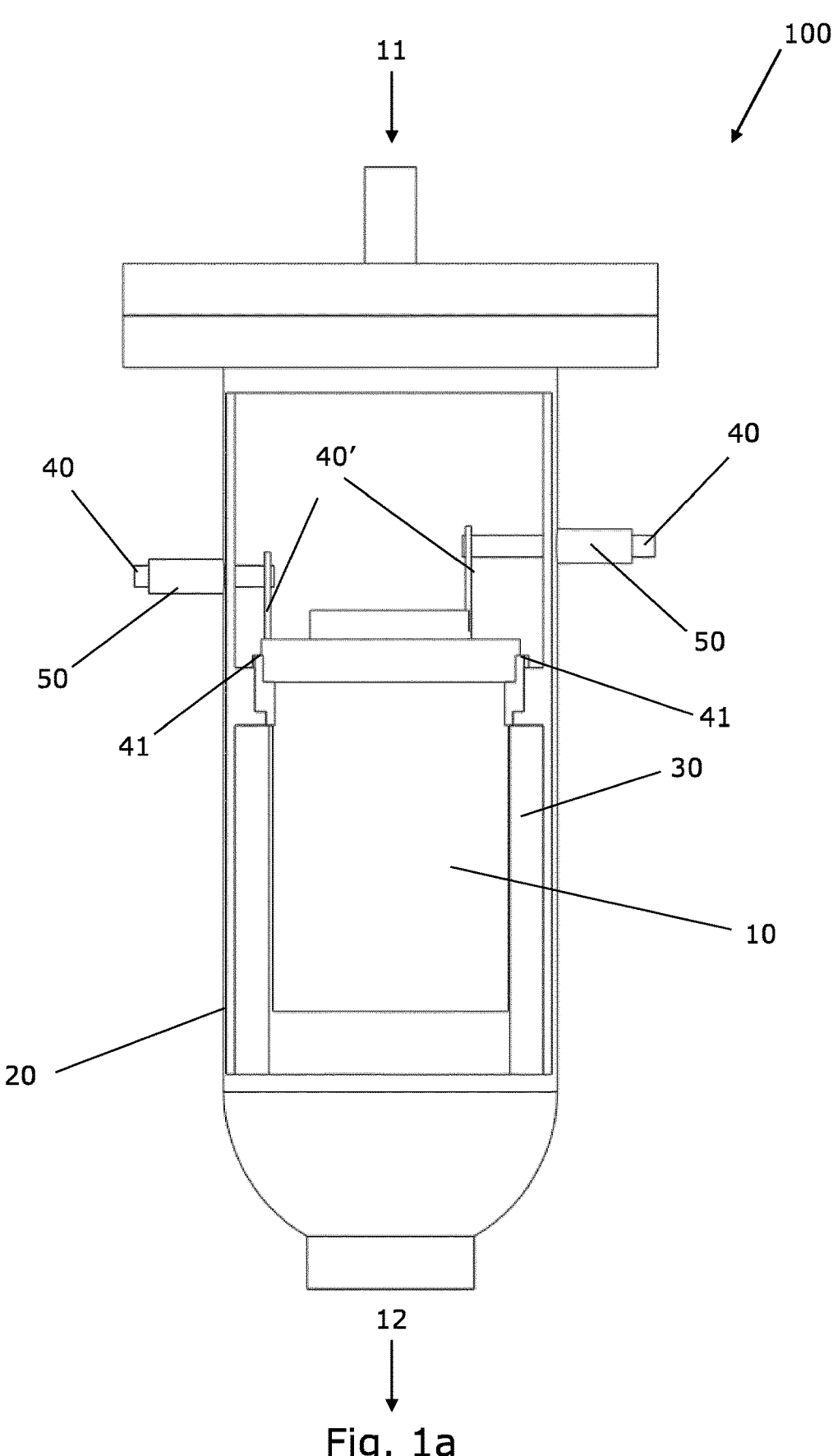
FIG. 1a illustrates a cross section through an embodiment of the inventive heating system with a structured body comprising a structures body, in a cross section.

The present technology describes a structured body for use in an electrically heated system to facilitate the task of heating gas in a compact design in an on-demand approach.

A compact electric heating system using a structured body can easily be operated and use easy start-up principles when needed. This gives a relatively inexpensive plant.

By arranging a second macroscopic structure at least partly circumferentially around a first macroscopic structure, the current density at the connection between the first and second macroscopic structures may be considerably reduced. Additionally, the risk of bypassing may be reduced.

A structured body arranged for heating a feed gas is thus provided, said structured body comprising a first macroscopic structure and a second macroscopic structure, each extending in a longitudinal direction from a first end to a second end, where said first end forms an inlet to said first and second macroscopic structures for said feed gas and said second end forms an outlet for heated gas, said first and second macroscopic structure comprising a three-dimensional network structure, wherein the network structure forms flow paths allowing the feed gas to flow from said first end to said second end, the network structure being formed by a metallic material being electrically conductive, wherein the second macroscopic structure is arranged at least partly circumferentially around the first macroscopic structure, and wherein the first and second macroscopic structures are electrically connected at the second end.

As used herein, the term "macroscopic structure" is meant to denote a structure that is large enough to be visible with the naked eye, without magnifying devices. The dimensions of the macroscopic structure are typically in the range of centimeters or even meters. Dimensions of the macroscopic structure are advantageously made to correspond at least partly to the inner dimensions of the pressure shell in which the structured body may be arranged, saving room for the heat insulation layer and conductors.

The first and second macroscopic structures both comprise a three-dimensional network structure. Thus, the first and second macroscopic structures are formed as a three-dimensional structure having one or more openings in the structure. These openings may as an example be flow channels for the gas, cut-outs filled with another material than the remaining part of the first and second macroscopic structures, cut-outs not being filled with a material, or other openings. The size and/or shape and/or position of the openings may vary, e.g. along the longitudinal direction and/or along a direction transverse to the longitudinal direction.

The network structure is formed by a metallic material being electrically conductive, such as an alloy comprising one or more substances selected from the group consisting of Fe, Cr, Al, Co, Ni, Zr, Cu, Ti, Mn, and Si.

The electrically conductive material for the network structure is advantageously a coherent or consistently intra-connected material in order to achieve electrical conductivity throughout the electrically conductive material, and thereby achieve thermal conductivity throughout the structured body, and in particular providing heating of the catalyst material, when the structured body comprises a catalyst material. By the coherent or consistently intra-connected material it is possible to ensure uniform distribution of current within the electrically conductive material and thus uniform distribution of heat within the structured body. Throughout this text, the term "coherent" is meant to be synonymous to cohesive and thus refer to a material that is consistently intra-connected or consistently coupled. The effect of the structured body being a coherent or consistently intra-connected material is that a control over the connectivity within the material of the structured body and thus the conductivity of the electrically conductive material is obtained. It is to be noted that even if further modifications of the electrically conductive material are carried out, such as provision of cut-out spaces within parts of the electrically conductive material, the electrically conductive material is still denoted a coherent or consistently intra-connected material.

The second macroscopic structure is arranged at least partly circumferentially around the first macroscopic structure. In one embodiment, the second macroscopic structure may be an elongated structure extending in the longitudinal direction and being hollow to thereby fully surround the first macroscopic structure, whereby an inner surface of the second macroscopic structure faces an outer surface of the first macroscopic structure. In an alternative embodiment, the second macroscopic structure may be arranged partly circumferentially around the first macroscopic structure, whereby a part of an inner surface of the second faces a part of an outer surface of the first macroscopic structure.

The structured body may be configured to direct an electrical current to run through the first macroscopic structure from the first end to said second end, then through the second macroscopic structure from the second end to the first end by electrically connecting the first and second macroscopic structures at the second end.

The first and second macroscopic structures may be formed in one piece, whereby the electrical connection may be a part of this single element; i.e. the electrical connection may be a transition portion also forming part of the single piece.

In an alternative embodiment, the first and second macroscopic structures are formed as two separate elements which may be attached to each other at the second end to thereby provide electrical connection between the first and second macroscopic structures.

In a further alternative, the structured body may comprise a bridge element which may be arranged between the first and second macroscopic structures to thereby provide an electrical connection between the first and second macroscopic structures.

The network structure may at least partly support a ceramic coating. The term "support a ceramic coating" is meant to denote that the network structure is coated by the ceramic coating at, at least, a part of the surface of the network structure. Thus, the term does not imply that all the surface of the network structure is coated by the ceramic coating; in particular, at least the parts of the macroscopic structure which are configured to be electrically connected to conductors do not have a coating thereon. The coating may be a ceramic material with pores in the structure which allows for supporting catalytically active material on and inside the coating. The ceramic coating is an electrically insulating material and will typically have a thickness in the range of around 100 µm, such as in the range of 10-500 µm.

In one embodiment, at least a part of the ceramic coating may support a catalytically active material. Advantageously, the catalytically active material comprises catalytically active particles having a size in the range from about 5 nm to about 250 nm.

The macroscopic structured may be produced by 3D printing. The manufacturing of the macroscopic structure may also include sintering of the 3D printed element. A ceramic coating, which may contain the catalytically active material, may be provided onto the macroscopic structure before a second sintering in an oxidizing atmosphere, in order to form chemical bonds between the ceramic coating and the macroscopic structure. Alternatively, the catalytically active material may be impregnated onto the ceramic coating after the second sintering. When chemical bonds are formed between the ceramic coating and the macroscopic structure a high heat conductivity between the electrically heated macroscopic structure and the catalytically active material supported by the ceramic coating may be achieved, offering close and nearly direct contact between the heat source and the catalytically active material of the structured catalyst. Due to close proximity between the heat source and the catalytically active material the heat transfer is effective, so that the structured catalyst can be very efficiently heated. A compact reactor system in terms of gas processing per reactor system volume is thus possible, and therefore the reactor system housing the structured catalyst may be compact.

As used herein, the terms "3D print" and "3D printing" is meant to denote a metal additive manufacturing process. Such metal additive manufacturing processes cover 3D printing processes in which material is joined to a structure under computer control to create a three-dimensional object, where the structure is to be solidified, e.g. by sintering, to provide the macroscopic structure. Moreover, such metal additive manufacturing processes cover 3D printing processes which do not require subsequent sintering, such as powder bed fusion or direct energy deposition processes. Examples of such powder bed fusion or direct energy deposition processes are laser beam, electron beam or plasma 3D printing processes.

Thus, at least one of the first and second macroscopic structures may be produced by 3D printing. In one embodiment, the first and second macroscopic structures may be produced as a single piece by 3D printing.

At least a part of the network structure may form a plurality of parallel flow channels. It should, however, be understood that at least some of the channels may be non-parallel. Thus, the network structure may have a plurality of parallel channels, a plurality of non-parallel channels and/or a plurality of labyrinthine channels, where the channels have walls defining the channels. Thereby, several different forms of the network structure can be used to expose a large surface area of the structured body to the gas. In a preferred embodiment, the network structure has parallel body, since such parallel channels render a structured catalyst with a very small pressure drop. In a preferred embodiment, parallel longitudinal channels are skewed in the longitudinal direction of the macroscopic structure. In this way, molecules of the gas flowing through the macroscopic structure will mostly tend to hit a wall inside the channels instead of just flowing straight through a channel without being in contact with a wall. The dimension of the channels should be appropriate to provide a macroscopic structure with a sufficient resistivity. For example, the channels could be quadratic (as seen in cross section perpendicular to the channels) and have a side length of the squares of between 1 and 3 mm; however, channels having a maximum extent in the cross section of up to about 4 cm are conceivable. The walls may e.g. have a thickness of between 0.2 and 2 mm, such as about 0.5 mm, and the ceramic coating supported by the walls may have a thickness of between 10 μm and 500 μm, such as between 50 μm and 200 μm, such as 100 μm.

At least one of the first and second macroscopic structures may comprise a circumferential wall forming an internal space, the circumferential wall being formed of a metallic material being electrically conductive, and wherein the network is arranged in the internal space. In an embodiment, the network structure may form a plurality of internal walls which may be arranged in the internal space formed by the circumferential wall. The plurality of internal walls may form a plurality of flow channels from the first end to the second end.

The second macroscopic structure is arranged at least partly circumferentially around the first macroscopic structure. The second macroscopic structure may be arranged circumferentially around at least 50%, such as at least 60%, such as at least 70%, such as at least 80%, such as at least 90%, such as 100% of an outer surface of the first macroscopic structure.

When the second macroscopic structure is arranged circumferentially around 50% of an outer surface of the first macroscopic structure, half of the outer surface of the first macroscopic structure faces the second macroscopic structure, whereas as the other 50% of the outer surface of the first macroscopic structure does not face the second macroscopic structure.

To facilitate arrangement of the second macroscopic structure at least partly circumferentially around the first macroscopic structure, an outer surface of the first macroscopic structure may match an inner surface of the second macroscopic structure. It should be understood, that the shapes may match, while the sizes may be different to ensure, that the first and second macroscopic structures are not arranged in contact with each other along the longitudinal direction hereof. The first and second macroscopic structures are electrically connected at the second end to allow a current flow through the first and second macroscopic structures.

By providing the first macroscopic structure with the outer surface matching an inner surface of the second macroscopic structure the distance between the first and second macroscopic structures can be minimized.

In one embodiment, the outer surface of the first macroscopic structure in a cross-section transverse to the longitudinal direction may be substantially circular. At least a part of the outer surface the second macroscopic structure in a cross-section transverse to the longitudinal direction may likewise be substantially circular. In an alternative embodiment, the outer surface of the first macroscopic structure in a cross-section transverse to the longitudinal direction may be substantially oval, square-shaped, triangular, pentagon-shaped, hexagon-shaped, other a form a shape of another polygon. Thus, the outer surface may be of any arbitrary shape. At least a port of the inner surface of the second macroscopic structure may likewise form any of the mentioned shapes, or a section of such a shape. The latter being particularly relevant, in embodiments where the second macroscopic structure is arranged partly circumferential around the first macroscopic structure.

The first and second macroscopic structures may be arranged substantially co-axially.

In a particular embodiment of the invention, the structured body further comprises one or more additional macroscopic structures, wherein each additional macroscopic structure is arranged at least partly circumferentially around the macroscopic structure arranged closest to the additional macroscopic structure on its inner side. Neighboring macroscopic structures may preferably be electrically connected alternatingly at the first end and at the second end. In a particular embodiment, the structured embodiment comprises an even number of additional macroscopic structures. In a particular embodiment, the structured embodiment comprises an uneven number of additional macroscopic structures. In the case of an uneven number of additional macroscopic, the structured body may comprise conducting wall of an electrically conducting material arranged at least partly circumferentially around the outermost additional macroscopic structure, wherein the conducting wall and the outermost additional macroscopic structure is electrically connected at the second end. The function of said conducting wall is to conduct the current from the second end to the first end of the structured body so as to allow a second conductor for passing electrical current away from the structured body to be connected to the first end of the structured body rather than the second end, see below for a more detailed explanation of first and second conductors. This is preferred, as the first end is typically operated at a lower temperature than the second end of the structured body, and hence the risk of breakdown of the connection between the conductor and the macroscopic structure is reduced.

In a particular embodiment, the structured body comprises a first additional macroscopic structure, wherein the first additional macroscopic structure is arranged at least partly circumferentially around the second macroscopic structure, and wherein the second and first additional macroscopic structures are electrically connected at the first end. In this case, the structured body may be configured to direct an electrical current to run through the first macroscopic structure from the first end to said second end, then through the second macroscopic structure from the second end to the first end, and subsequently through the first additional macroscopic structure from the first end to the second end.

The first, second, and additional macroscopic structures may be arranged substantially co-axially. It should be understood that the remarks above in relation to the relative shape and size of the first and second macroscopic structure are equally applicable in relation to the second and additional macroscopic structures.

It should further be understood, that the structured body may comprise even more macroscopic structures, such as four, five, or even more.

To facilitate a current flow through the structured body, the structured body may further comprises at least a first and a second conductor electrically connected to said first and second macroscopic structures, respectively, and to an electrical power supply, wherein said electrical power supply may be dimensioned to heat at least part of said first and second macroscopic structure to a temperature of at least 500° C. by passing an electrical current through said macroscopic structures, the conductors being connected at positions on the first and second macroscopic structures closer to said first end than to said second end, the structured body being configured to direct an electrical current to run from the first conductor through the first macroscopic structure to said second end, then through the second macroscopic structure to the second conductor.

Preferably, the first and second conductors are connected to first end of the structured body or within a quarter of the length of the macroscopic structures, the quarter being located closest to the first end.

To facilitate attachment of the first and second conductors, the first and second macroscopic structures may each comprise an attachment section to allow attachment of first and second conductor, respectively. The attachment sections may be 3D printed in one piece with the first and second macroscopic structures.

At least one of the first and second macroscopic structures may comprise a network structure comprising a plurality of cut-outs. The cut-outs may be filled with a cut-out material having a lower conductivity than that of the metallic material. The cut-outs may be formed as a part of a 3D printing process which may be used to form the network structure(s).

In one embodiment, the cut-out material may be a void. I.e. the cut-outs may be empty to thereby provide openings through which the gas may pass when flowing from the first end to the second end. These cut-outs may increase mixing of the gas passing through the macroscopic structure.

In an alternative embodiment, the cut-out material is a solid cut-out material. Consequently, the cut-outs may be closed whereby mixing of gas flowing from the first end to the second end through these cut-outs may be prevented. The network structure may comprise cut-outs filled with different materials, whereby a first cut-out may be filled with a first cut-out material, whereas a second cut-out may be filled with a second cut-out material. In an embodiment, the solid cut-out material at least partly supports a ceramic coating with a catalytically active material similar to that on the metallic material. In this embodiment, increased catalytic activity is achieved in parallel to the control of the resistance of the material.

The solid cut-out material may have thermo-mechanical properties being substantially equivalent to thermo-mechanical properties of the metallic material forming the network structure. The thermos-mechanical properties may be the thermal expansion coefficient to thereby achieve substantial equal expansion of the network structure and the solid cut-out material arranged in the cut-outs during use of the catalyst. Alternatively, or additionally, the thermos-mechanical properties may be tensile strength.

The network structure may in one embodiment comprise one or more cut-outs being voids and one or more cut-outs filled with a solid cut-out material. Thus, the network structure may comprise a first subgroup of cut-outs being voids, and may comprise a second sub-group of cut-outs is filled with a solid cut-out material. It should be understood, that a sub-group may comprise only a single cut-out. It should further be understood that the cut-outs of the second sub-group may be filled with different materials, so that a first cut-out is filled with a first cut-out material, whereas a second cut-out is filled with a second cut-out material.

The cut-outs may have a plurality of shapes. As an example, at least one of the cut-outs has a shape selected from the group consisting of a sphere, a disc, an ellipsoid, a droplet, a spiral, and a polyhedron, such as a box, a pyramid, a diamond, and a rhombus.

In one embodiment, all cut-outs have the same shape, whereas at least some of the cut-outs in other embodiments are of a different shape. As an example, a network structure may comprise a first group of cut-outs being disc-shaped, and a second group of cut-out having the shape of a sphere. Thus, the network structure may comprise cut-out of which at least two of the cut-outs are of different form and/or shape.

The macroscopic structure may comprise flow guides to ensure flow distribution of gas flowing from the inlet at the first end toward the outlet at the second end. These flow guides may be 3D printed as one piece with the macroscopic structure. The flow guide may form part of the network structure, and may be 3D printed as a part of the network structure.

The flow guides may in one embodiment be evenly distributed along the longitudinal direction of the macroscopic structure, whereas they in another embodiment may be unevenly distributed. It should further be understood that flow guide may in one embodiment be arranged along a part of the longitudinal direction, and in an alternative embodiment be arranged along the full length of the macroscopic structure in the longitudinal direction.

The flow guides may additionally serve as electrical terminals which may minimize contact resistance and thereby provide a more even current distribution.

A heating system for heating of a feed gas is provided; said heating system comprising:
- a) at least one structured body as described herein;
- b) a pressure shell housing said structured body, said pressure shell comprising an inlet for letting in said feed gas and an outlet for letting out heated gas, wherein said inlet is positioned so that said feed gas enters said structured body in a first end and said heated gas exits said body from a second end; and
- c) a heat insulation layer between said structured body and said pressure shell.

The layout of the heating system allows for feeding a pressurized feed gas to the heating system at an inlet and directing this gas into the pressure shell of the heating system. Inside the pressure shell, a configuration of heat insulation layers and inert material is arranged to direct the feed gas through the structured body. The heated gas from the heated structured body is led to the heating system outlet.

It should be understood, that a skilled person would readily recognise that any feature described in combination with structured body could also be combined with the heating system for heating a feed gas, and vice versa.

In one embodiment, the heating system may comprise a single structured body comprising a first and a second macroscopic structure, where the second macroscopic structure is arranged at least partly circumferentially around the first macroscopic structure. In an alternative embodiment, the heating system may comprise a single structured body comprising a first, a second, and at least one additional macroscopic structure, where the second macroscopic structure is arranged at least partly circumferentially around the first macroscopic structure, and wherein the at least one additional macroscopic structure is arranged at least circumferentially around the second macroscopic structure.

In a further alternative embodiment, the heating system may comprise two or more structured bodies which may be connected in order to provide an array of structured bodies. In the array of structured bodies, the structured bodies may be electrically connected to each other. The structured bodies may be positioned adjacent to each other.

An important feature of the resistance heating process is thus that the energy is supplied inside the object itself, instead of being supplied from an external heat source via heat conduction, convection and radiation. Moreover, the hottest part of the heating system will be within the pressure shell of the heating system. Preferably, the electrical power supply and the structured body are dimensioned so that at least part of the structured body reaches a temperature of at least 700° C., preferably at least 900° C., more preferably at least 1000° C. The surface area of the electrically conductive material, the fraction of the electrically conductive material coated with an—optional—ceramic coating, and the type and structure of the ceramic coating may be tailored to the specific operating conditions.

The heating system may comprise a control system arranged to control the electrical power supply to ensure that the temperature of the gas exiting the pressure shell lies in a predetermined range.

The heated gas exiting the heating system at the outlet may have substantially the same chemical composition and molar flow rate at the feed gas, as no chemical reaction takes place in the heating system. Thus, the feed gas may have essentially the same chemical composition at the inlet as at the outlet of the pressure shell housing.

The heating system may comprise at least two conductors electrically connected to the structured body and to an electrical power supply placed outside said pressure shell, wherein said electrical power supply is dimensioned to heat at least part of said structured body to a temperature of at least 400° C. by passing an electrical current through the first and second macroscopic structures, wherein said at least two conductors are connected to the first macroscopic structure at a position closer to the first end, and wherein the structured body is constructed to direct an electrical current to run from one conductor substantially via the first macroscopic structure to the second macroscopic structure and return to a second of said at least two conductors.

Preferably, the conductors are made of a different material than the electrically conductive material. The conductors may for example be of iron, nickel, aluminium, copper, silver, or an alloy thereof.

The term "electrically conductive" is meant to denote materials with an electrical resistivity in the range from: $10^{-5}$ to $10^{-8}$ Ω·m at 20° C. Thus, materials that are electrically conductive are e.g. metals like copper, silver, aluminum, chromium, iron, nickel, or alloys of metals. Moreover, the term "electrically insulating" is meant to denote materials with an electrical resistivity above 10 Ω·m at 20° C., e.g. in the range from $10^9$ to $10^{25}$ Ω·m at 20° C.

The gas flow over the structured body may be axial or co-axial with the current path through the structured body, perpendicular to the current path or have any other appropriate direction in relation to the current path.

The electrical power supply may be dimensioned to heat at least part of said structured body to a temperature of at least 700° C., preferably at least 900° C., more preferably at least 1000° C.

The feedstock may be substantially pure streams of steam and a hydrocarbon, alternatively it may be a pure $CO_2$ or pure $H_2$. Also, the feedstock to the heating process may include recycle streams from unit operations downstream the heating system.

In an embodiment, the feed gas may be substantially pure $CO_2$, which is heated to 800° C., or even 1000° C., or even 1200° C. The heated $CO_2$ may after outlet from the heating system be mixed with a hot synthesis gas and equilibrated according to steam methane reforming, methanation and reverse water gas shift reactions in an adiabatic post converter (APOC) for production of CO in a CO rich synthesis gas.

By, the reverse water gas shift reaction is understood:

$$CO_2 + H_2 \leftrightarrows H_2O + CO$$

The methanation (and reverse steam reforming) reaction is understood as:

$$CO + 3H_2 \leftrightarrows H_2O + CH_4$$

The hot synthesis gas may be provided from any suitable reforming technology, such as a tubular reformer, an autothermal reformer or an electrical reformer.

The use of the adiabatic post convertor (APOC) enables an overall process operation for synthesis gas production at very severe conditions and low steam addition compared to e.g. a stand-alone tubular reformer, as carbon limits in this way can be partly circumvented, which otherwise will pose process limitations on the said reactor system.

By CO rich synthesis gas stream is understood a gas stream with a relative high amount of CO. In an embodiment the CO rich synthesis gas comprises a gas mixture of a $H_2$/CO ratio below 3, such as preferably below 2, or even below 1.

In an embodiment, the feed gas is a mixture of different gasses, such as $N_2$ and $H_2$.

In an embodiment, the heated feed gas comprising $N_2$ and $H_2$ may be used to reduce an ammonia catalyst e.g. in a subsequent ammonia synthesis reactor. The heated feed gas comprising $N_2$ and $H_2$ may be heated to 500° C.

When the heating system comprises a heat insulation layer between the structured body and the pressure shell, appropriate heat and electrical insulation between the structured body and the pressure shell is obtained. The presence of heat insulating layer between the pressure shell and the structured body assists in avoiding excessive heating of the pressure shell, and assists in reducing thermal losses to the surroundings. The temperatures of the structured body may reach up to about 1300° C., at least at some parts thereof, but by using the heat insulation layer between the structured body and the pressure shell the temperature of the pressure shell can be kept at significantly lower temperatures of say 500° C. or even 100° C., which is advantageous as typical construction steel materials typically are unsuitable for pressure bearing application at temperatures above 1000° C.

Moreover, a heat insulating layer between the pressure shell and the structured body assists in control of the electrical current within the heating system, since heat insulation layer is also electrically insulating. The heat insulation layer could be one or more layers of solid material, such as ceramics, inert material, fiber material, bricks or a gas barrier or a combination thereof. Thus, it is also conceivable that a purge gas or a confined gas constitutes or forms part of the heat insulation layer.

It should be noted that the term "heat insulating material" is meant to denote materials having a thermal conductivity of about 10 W·m$^{-1}$·K$^{-1}$ or below. Examples of heat insulating materials are ceramics, bricks, alumina-based materials, zirconia based materials and similar.

Advantageously, any relevant gaps between structured body, the heat insulation layer, the pressure shell, and/or any other components inside the heating system is filled with inert material, e.g. in the form of inert pellets. Such gaps are e.g. a gap between the lower side of the structured body and the bottom of the pressure shell and a gap between the sides of the structured body and the insulation layer covering the inner sides of the pressure shell. The inert material may e.g. be a ceramic material in the form of pellets or tiles. The inert material assists in controlling the gas distribution through the heating system and in controlling the flow of the gas through the structured body. Moreover, the inert material typically has a heat insulating effect.

The pressure shell may have a design pressure of between 2 bar and 30 bar. The actual operating pressure will be determined by the size of the plants, among other aspects. As the hottest part of the heating system is the electrically conductive material, which will be surrounded by heat insulation layer and within the pressure shell of the heating system, the temperature of the pressure shell can be kept significantly lower than the maximum process temperature. This allows for having a relative low design temperature of the pressure shell of e.g. 700° C. or 500° C. or preferably 300° C. or 100° C. of the pressure shell whilst having maximum process temperatures of 400° C., or even 900, or even 1100° C., or even up to 1300° C. on the structured body. Material strength is higher at the lower of these temperatures (corresponding to the design temperature of the pressure shell as indicated above). This offers advantages when designing the heating system. Thus, the pressure shell may have a design pressure of between 2 bar and 30 bar, or between 30 and 200 bar. Around 30 bar is preferable as a compromise between process economy and thermodynamic limitations.

The resistivity of the electrically conductive material may be between 10$^{-5}$ Ω·m and 10$^{-7}$ Ω·m. A material with a resistivity within this range provides for an efficient heating of the structured body when energized with a power source. Graphite has a resistivity of about 10$^{-5}$ Ω·m at 20° C., kanthal has a resistivity of about 10$^{-6}$ Ω·m at 20° C., whilst stainless steel has a resistivity of about 10$^{-7}$ Ω·m at 20° C. The electrically conductive material may for example be made of FeCrAlloy having a resistivity of ca. 1.5·10$^{-6}$ Ω·m at 20° C.

Typically, the pressure shell comprises an inlet for letting in feed gas and an outlet for letting out heated gas, wherein the inlet is positioned close to a first end of the pressure shell and the outlet is positioned close to a second end of the pressure shell, and wherein the at least two conductors both are connected to the structured body at a position on the structured body closer to the inlet than to the outlet. Hereby, the at least two conductors can be placed in the substantially colder part of the heating system as the inlet gas will have lower temperature than the product gas, the electrically conductive material will be colder in the most upstream part of the material due to the heat consumed by the progress of the heating, and the feed gas fed through the inlet may cool the at least two conductors before being heated by the heated structured body further along the path of the gas over the heated structured body. It is an advantage that the temperature of all electrically conducting elements except the electrically conductive material is kept down in order to protect the connections between the conductors and the structured body. When the temperature of the conductors and other electrically conducting elements, except the electrically conductive material, is relatively low, less limitations on materials suitable for the conductors and other electrically conducting elements, except the electrically conductive material, exists. When the temperature of the electrically conducting elements increase, the resistivity thereof increases; therefore, it is desirable to avoid unnecessary heating of all other parts than the electrically conductive materials within the heating system. The term "electrically conducting elements, except the electrically conductive material" is meant to cover the relevant electrically conducting elements arranged to connect the power supply to the structured body, except the electrically conductive structured body itself.

It should be noted that the system of the invention may include any appropriate number of power supplies and any appropriate number of conductors connecting the power supply/supplies and the electrically conductive material(s) of the structured body.

The at least two conductors may be led through a pressure shell in a fitting so that the at least two conductors are electrically insulated from the pressure shell. The fitting may be, partly, of a plastic and/or ceramic material. The term "fitting" is meant to denote a device that allows for mechanically connecting two pieces of hardware in a pressure bearing configuration. Thereby, the pressure within the pressure shell may be maintained even though the at least two conductors are lead through it. Non-limiting examples of the fittings may be an electrically insulating fitting, a dielectric fitting, a power compression seal, a compression fitting or a flange. The pressure shell typically comprises side walls, end walls, flanges and possibly further parts. The term "pressure shell" is meant to cover any of these components.

The connection between the structured body and the at least two conductors may be a mechanical connection, a welded connection, a brazed connection, or a combination thereof. The structured body may comprise terminals physically and electrically connected to the structured body in order to facilitate the electrical connection between the electrically conductive material and the at least two conductors. The term "mechanical connection" is meant to denote a connection where two components are held together mechanically, such as by a threaded connection or by clamping, so that a current may run between the components.

In a particular embodiment of a structured body of the invention, the electrical connection between the first and second macroscopice structures is made by mechanical connection, clamping, soldering, welding or any combination of these connection methods.

In a particular embodiment of a structured body of the invention, the electrical connection between the first and second macroscopice structures is in the form of a connector comprising at least two engagement means each engaging one of said first and second macroscopic structures, wherein the engagement means has an inner surface with a shape matching at least a part of the outer surface of said first and second macroscopic structures, and wherein the engagement means is attached to the outer surface of the circumferential wall by an interference fit. In the context of the present invention, 'an interference fit' (also known as a press fit or friction fit) should be understood as a fastening between two tight fitting mating parts to thereby produce a joint which is held together by friction after the parts are pushed/pressed together. The connector and the macroscopic structure(s) may be joined by applying a forced pressure, from e.g. a press, on one part to slide it over/into the other. In a particular embodiment, the connector is formed of an alloy comprising one or more substances selected from the group consisting of Fe, Cr, Al, Co, Ni, Zr, Cu, Ti, Mn, and Si.

In a particular embodiment of a structured body of the invention, the electrical connection between the first and second macroscopic structures is in the form of a bridge of an electrically conductive material, wherein the bridge and the first and second macroscopic structures together form a coherent structure. Here, "coherent" means forming a continuous phase. In a particular embodiment, the bridge is formed by providing electrically conductive materials of the first macroscopic structure, the second macroscopic structure and the bridge in the form of three separate entities, and joining the separate entities together by a method comprising a step of sintering or oxidizing treatment. In a particular embodiment, the combination of the bridge and the first and second macroscopic structures is 3D printed and then sintered. In particular embodiment, the electrically conductive material of the bridge is an alloy comprising one or more substances selected from the group consisting of Fe, Cr, Al, Co, Ni, Zr, Cu, Ti, Mn, and Si. In a particular embodiment, the electrically conductive materials of the bridge and the first and the second macroscopice structures are the same. The electrically conductive materials placed in an array of electrically conductive materials may be electrically connected to each other. The connection between the two or more electrically conductive materials may be by mechanical connection, clamping, soldering, welding or any combination of these connection methods. Each electrically conductive material may comprise terminals in order to facilitate the electrical connections. The two or more electrically conductive materials may be connected to the power supply in serial or parallel connection. The electrical connection between the two or more electrically conductive materials is advantageously coherent and uniform along the connection surface between the two or more electrically conductive materials, so that the two or more electrically conductive materials act as a single coherent or consistently intra-connected material; hereby, uniform electrical conductivity throughout the two or more electrically conductive materials is facilitated. Alternatively, or additionally, the structured body may comprise an array of electrically conductive materials that are not electrically connected to each other. Instead, two or more electrically conductive materials are placed together within the pressure shell, but not connected electrically to each other. In this case, the structured body thus comprises electrically conductive materials connected in parallel to the power supply.

A ceramic coating may be added directly to a metal surface of the electrically conductive material by wash coating. The wash coating of a metal surface is a well-known process; a description is given in e.g. Cybulski, A., and Moulijn, J. A., "Structured bodys and reactors", Marcel Dekker, Inc, New York, 1998, Chapter 3, and references herein. The ceramic coating may for example be an oxide comprising Al, Zr, Mg, Ce and/or Ca. Exemplary coatings are calcium aluminate or a magnesium aluminum spinel. Such a ceramic coating may comprise further elements, such as La, Y, Ti, K or combinations thereof. The ceramic coating is an electrically insulating material and will typically have a thickness in the range of around 100 $\mu$m, say 10-500 $\mu$m.

Extruding and sintering or 3D printing a macroscopic structure results in a uniformly and coherently shaped macroscopic structure, which can afterwards be coated with the ceramic coating.

The electrically conductive material and the ceramic coating may have been sintered in an oxidizing atmosphere in order to form chemical bonds between the ceramic coating and the electrically conductive material; this provides for an especially high heat conductivity between the electrically conductive material and the ceramic coating. Thereby, the structured body is compact in terms of heat transfer, and a heating system housing the structured body may be compact and limited mainly by the rate of the heating.

In an embodiment, the structured body may have at least one electrically insulating part arranged to increase the current path between the conductors to a length larger than the largest dimension of the structured body. The provision of a current path between the conductors larger than the largest dimension of the structured body may be by provision of electrically insulating part(s) positioned between the conductors and preventing the current running through some part of the structured body. Such electrically insulating parts are arranged to increase the current path and thus increase the resistance through the structured body. Hereby, the current path through the structured body can be e.g. more than 50%, 100%, 200%, 1000%, or even 10000% longer than the largest dimension of the structured body.

Non-limiting examples of insulating parts are cuts, slits, or holes in the structure. Optionally, a solid insulating material such as ceramics in cuts or slits in the structure can be used. A solid insulating material within a cut or slit assists in keeping the parts of the structured body on the sides of the cut or slit from each other. As used herein, the term "largest dimension of the structured body" is meant to denote the largest inner dimension of the geometrical form taken up by the structured body. If the structured body is box-formed, the largest dimension would be the diagonal from one corner to the farthest corner, also denoted the space diagonal.

It should be noted that the insulating parts arranged to increase the current path are not necessarily related to the ceramic coating on the electrically conductive material; even though this ceramic coating is also considered electrically insulating, it does not change the length of the current path between the conductors connected to the electrically conductive material.

It should be noted that even though the current through the structured body may be arranged to twist or wind its way through the structured body due to the electrically insulating parts arranged to increase the current path, the gas passing through the heating system is inlet at one end of the heating system, passes over the structured body once before being outlet from the heating system. Inert material is advantageously present in relevant gaps between the structured body and the rest of the heating system to ensure that the gas within the heating system passes over the structured body.

The length of the gas passage through the structured body is suitably less than the length of the passage of current from one electrode through the structured body and to the next electrode. The ratio of the length of the gas passage to the length of the current passage may be less than 0.6, or 0.3, 0.1, or even down to 0.002.

The geometric surface area of the macroscopic structure may be between 100 and 3000 $m^2/m^3$, such as between 500 and 1100 $m^2/m^3$. Typically, the material of the macroscopic structure is chosen as a material arranged to supply a heat flux of 500 $W/m^2$ to 50 $kW/m^2$ by resistance heating of the material. Preferably, resistance heating of the material supplies a heat flux of between 5 $kW/m^2$ and 12 $kW/m^2$, for example between 8 $kW/m^2$ and 10 $kW/m^2$. The heat flux is given as heat per geometric surface area of the surface exposed to the gas.

The predetermined temperature range of the gas exiting the pressure shell/the heating system is the range from 200 to 1400° C. The heated gas outlet temperature from the structured body is measured directly beneath or on the most downstream surface of the structured body. Measuring technology can be thermocouples (by voltage drop), resistance temperature detectors or infrared detection. The measuring point can be separated from the structured body and be embedded in downstream inert, or be directly on the surface with an insulating surface coverage.

The structured body within said heating system suitably has a ratio between the area equivalent diameter of a horizontal cross section through the structured body and the height of the structured body in the range from 0.05 to 2.0. The area equivalent diameter of the cross section through the heating system is defined as the diameter of a circle of equivalent area as the area of the cross section. When the ratio between the area equivalent diameter and the height of the structured body is between 0.1 and 2.0, the pressure shell housing the structured body may be relatively small compared to other heating systems.

Typically, the gas flows through the heating system in an upflow or downflow direction, so that the gas flows through channels in the structured body along the height thereof.

The volume of the structured body is chosen in consideration of the desired temperature out of the heating system correlated to the heat generation capacity of the electrically conductive material.

The height of the heating system may be between 0.5 and 7 m, more preferably between 0.5 and 3 m. Exemplary values of the height of the heating system is a height of less than 5 meters, preferably less than 2 m or even 1 m. The dimensions of the heating system and of the structured body within the heating system are correlated; of course, the pressure shell and heat insulation layer render the heating system somewhat larger than the structured body itself.

The heating system described above is not a segregated system. As heating is not transferred across a pressure bearing wall, the risk of mechanical failure is not high. This means that start-up is fast in comparison and in practice the current invention can be started by applying a given voltage and then the system will work towards a thermal equilibration to reach steady state without any additional operator input.

A process is provided for heating a feed gas in a heating system as described herein; said process comprising the steps of:

pressurizing said feed gas,
supplying said pressurized feed gas to the heating system,
supplying electrical power via electrical conductors connecting an electrical power supply placed outside said pressure shell to said structured body, allowing an electrical current to run through said electrically conductive material, thereby heating at least part of the structured body,
heating the feed gas over the structured body and
outletting a heated gas from the heating system.

All details of the system given above are—wherever possible—relevant to the process described above.

In one aspect, the feed gas is pressurised to a pressure between 2 and 30 bar. The feed gas may be pressurised to a pressure between 30 and 200 bar. Suitably, at least part of the structured body is heated to a temperature of at least 700° C., preferably at least 900° C., more preferably at least 1000° C. The maximum temperature to which the structured body is heated is ca. 1400° C.

The process may comprise further steps carried out on the product gas, such as purification, pressurization, additional heating, cooling, etc. to provide the final heated gas for an application downstream the heating system of this invention.

It should be noted that the feed gas may comprises individual feed gasses and that the step of pressurizing the feed gas may comprise pressurizing individual feed gasses individually. Moreover, it should be noted that the order in which the steps of the process are written are not necessarily the order in which the process steps take place, in that two or more steps may take place simultaneously, or the order may be different that indicated above.

In an embodiment, the process comprises the step of pressurizing the gas upstream the pressure shell to a pressure of up to at least 2 bar. The chosen operating pressure is defined by the integration of the heated in the surrounding process steps.

In an embodiment of the process according to the invention, the temperature of the feed gas let into the heating system is between 100° C. and 700° C., preferably between 100 and 300° C. However, in all embodiments the temperature and the pressure of the feed gas are adjusted to ensure that the feed gas is above the dew point.

A reactor system is provided for carrying out an endothermic reaction of a feed gas, said reactor system comprising:

a) a structured body as described herein;
b) a pressure shell housing said structured catalyst, said pressure shell comprising an inlet for letting in said feed gas and an outlet for letting out product gas, wherein said inlet is positioned so that said feed gas enters said structured body in a first end and said product gas exits said catalyst from a second end; and
c) a heat insulation layer between said structured body and said pressure shell.

It should be understood, that a skilled person would readily recognise that any feature described in combination with the structured body comprising a catalytically active material could also be combined with the reactor system for carrying out an endothermic reaction of a feed gas, and vice versa.

The structured body comprising a catalytically active material as described above is very suitable for the reactor system for carrying out an endothermic reaction of a feed gas. The remarks set forth above in relation to the structured body are therefore equally applicable in relation to the reactor system.

The layout of the reactor system allows for feeding a pressurized feed gas to the reactor system at an inlet and directing this gas into the pressure shell of the reactor system. Inside the pressure shell, a configuration of heat insulation layers and inert material is arranged to direct the feed gas through the channels of the structured body where it will be in contact with the ceramic coating and the catalytically active material supported on the ceramic coatings, where the catalytically active material will facilitate the endothermic reaction. Additionally, the heating of the structured body will supply the required heat for the endothermic reaction. The product gas from the structured body is led to the reactor system outlet.

When the pressure shell comprises an inlet for letting in feed gas and an outlet for letting out product gas, where the inlet is positioned so that the feed gas enters the structured body in a first end of the structured body and the product gas exits the structured body from a second end of the structured body, and when the at least two conductors both are connected to the structured body at a position on the structured body closer to the inlet than to the outlet, the at least two conductors can be placed in the relatively colder part of the reactor system. The first end of the structured body has a lower temperature than the second end of the structured body due to:

the feed gas fed led through the inlet may cool the at least two conductors be-fore being heated by the structured body further along the path of the gas through the structured body;

the feed gas inlet into the first end of the structured body will have lower temperature than the product gas leaving the second end of the structured body, due to the heat supplied to the structured body electrically, The endothermic nature of the reactions absorbs heat from its surroundings, The structured body is constructed to direct an electrical current to run from one conductor substantially to the second end of the structured body and return to a second of the at least two conductors.

The temperature profile in the structured body may correspond to a substantially continuously increasing temperature along the path of the feed gas through the structured body.

When the reactor system of the invention is used to facilitate the steam reforming reaction it has several advantages over the more traditionally used fired tubular reformer. The reactor system of the invention does not need a furnace, and this reduces the overall reactor size considerably. Moreover, it is an advantage that the amount of product gas produced in a single pressure shell is increased considerably compared to known tubular steam reformers. In a standard tubular steam reformer, the amount of product gas produced in a single tube of the tubular steam reformer is up to 500 $Nm^3/h$. In comparison, the reactor system of the invention is arranged to produce up to or more than 2000 $Nm^3/h$, e.g. even up to or more than 10000 $Nm^3/h$, within a single pressure shell. This can be done without the presence of $O_2$ in the feed gas and with less than 10% methane in the synthesis gas produced. When a single pressure shell houses catalyst for producing up to 10000 $Nm^3/h$, or more, product gas, it is no longer necessary to provide a plurality of pressure shells or means for distributing feed gas to a plurality of such separate pressure shells.

Another advantage of the reactor system is that the flow through the structured body within the reactor system may be up-flow, due to the structured body comprising a macroscopic structure supporting a catalytically active material. Alternatively, the flow through the structured body could be in the horizontal direction or any other appropriate direction. This is more difficult in the case where the reactor contains pellets due to the risk of fluidization, grinding, and blowing out the pellets. Thereby, a substantial amount of piping may be avoided, thus reducing plant costs. Furthermore, the possibility of up-flow or horizontal flow increases the flexibility in plant design.

Moreover, it should be noted that the term "the at least two conductors are connected to the structured body at a position on the structured body closer to the first end of the structured body than to the second end of the structured catalyst" is meant to denote that both/all of the at least two conductors are connected closer to the first end of the structured body than to the second end. Preferably, the at least two conductors are connected to first end of the structured body or within the quarter of the length of the/a macroscopic structure closest to the first end.

Use of the structured body comprising a catalytically active material described above or the reactor described above is provided, wherein the endothermic reaction is selected from the group consisting of steam methane reforming, hydrogen cyanide formation, methanol cracking, ammonia cracking, reverse water gas shift and dehydrogenation.

The term "dehydrogenation" is meant to denote the following reaction:

$$R1-CH_2-CH_2-R2 \Leftrightarrow R1-CH=CH-R2+H_2$$

Where R1 and R2 may be any appropriate group in a hydrocarbon molecule, such as —H, —$CH_3$, —$CH_2$, or —CH.

In an embodiment, the endothermic reaction is dehydrogenation of hydrocarbons. The catalytically active material may be Pt. The maximum temperature of the reactor may be between 500-700° C. The pressure of the feed gas may be 2-5 bar.

The term "water gas shift" is meant to denote the following reactions:

$$CO+H_2O \Leftrightarrow CO_2+H_2$$

In an embodiment, the endothermic reaction is the reverse water gas shift reaction (the reverse reaction of water gas shift). The maximum temperature of the reactor may be between 600-1300° C. The pressure of the feed gas may be 2-80 bar, preferably 10-40 bar. In an embodiment said macroscopic structure is made of an alloy of Fe Cr Al, supporting a ceramic coating of a $ZrO_2$ and $Al_2O_3$ mixture, with Mn as catalytically active material. In another embodiment, said macroscopic structure is made of an alloy of Fe Cr Al, supporting a ceramic coating of a $ZrO_2$ and $MgAl_2O_4$ mixture, with Ni as catalytically active material.

The term "methanol cracking" is meant to denote the following reactions:

$$CH_3OH \Leftrightarrow CO+2H_2$$
$$CH_3OH+H_2O \Leftrightarrow CO_2+3H_2(x)$$

Typically, methanol cracking reaction is accompanied by the water gas shift reaction.

In an embodiment, the endothermic reaction is cracking of methanol. The maximum temperature of the reactor may be between 200-300° C. The pressure of the feed gas may be 2-30 bar, preferably about 25 bar. In an embodiment said macroscopic structure is made of an alloy of Fe Cr Al, supporting a ceramic coating of a $ZrO_2$ and $Al_2O_3$ mixture, with CuZn as catalytically active material. In another embodiment, said macroscopic structure is made of an alloy of Fe Cr Al, supporting a ceramic coating of a $ZrO_2$ and $MgAl_2O_4$ mixture, with Ni as catalytically active material.

Moreover, the term "steam reforming" is meant to denote a reforming reaction according to one or more of the following reactions:

$$CH_4 + H_2O \Leftrightarrow CO + 3H_2$$

$$CH_4 + 2H_2O \Leftrightarrow CO_2 + 4H_2$$

$$CH_4 + CO_2 \Leftrightarrow 2CO + 2H_2$$

These reactions are typically coupled with the water gas shift reaction as well.

In an embodiment, the endothermic reaction is steam reforming of hydrocarbons. The maximum temperature of the reactor may be between 850-1300° C. The pressure of the feed gas may be 5-180 bar, preferably about 25 bar. The catalytically active material may be Ni, Ru, Rh, Ir, or a combination thereof, while the ceramic coating may be $Al_2O_3$, $ZrO_2$, $MgAl_2O_4$, $CaAl_2O_4$, or a combination therefore and potentially mixed with oxides such as Y, Ti, La, or Ce. In an embodiment said macroscopic structure is made of an alloy of Fe Cr Al, supporting a ceramic coating of a $ZrO_2$ and $MgAl_2O_4$ mixture, with nickel as catalytically active material.

The term "ammonia cracking" is meant to denote the following reactions:

$$2NH_3 \Leftrightarrow N_2 + 3H_2$$

In an embodiment, the endothermic reaction is ammonia cracking. The catalytically active material may be Fe or Ru. The maximum temperature of the reactor may be between 400-700° C. The pressure of the feed gas may be 2-30 bar, preferably about 25 bar.

The term "hydrogen cyanide synthesis" is meant to denote the following reactions:

$$2CH_4 + 2NH_3 + 3O_2 \Leftrightarrow 2HCN + 6H_2O$$

$$CH_4 + NH_3 \Leftrightarrow HCN + 3H_2$$

In an embodiment, the endothermic reaction is the hydrogen cyanide synthesis or a synthesis process for organic nitriles. The catalytically active material may be Pt, Co, or SnCo. The maximum temperature of the reactor may be between 700-1200° C. The pressure of the feed gas may be 2-30 bar, preferably about 5 bar.

In an embodiment, the reactor system further comprises a bed of a catalyst material, such as catalyst pellets, upstream the structured body within the pressure shell. Here, the term "upstream" is seen from the flow direction of the feed gas. Thus, the term "upstream" is here meant to denote that the feed gas is directed through the bed of catalyst material prior to reaching the structured catalyst. Such a bed of a catalyst may perform a preconditioning of the feed mixture, by e.g.

an adiabatic reaction towards a thermal equilibrium of a chemical reaction such as water-gas-shift. Additionally/alternatively, the bed of a catalyst material may be used as guard to prevent contamination of the downstream structured body by impurities such as sulphur and/or chlorine. No specific heating needs to be provided to the bed of catalyst material; however, the bed of catalyst material may be heated indirectly if it is in close proximity to the structured body.

In an embodiment a bed of catalyst material is placed within the pressure shell and downstream the structured body. Such catalyst material may be in the form of catalyst pellets, extrudates or granulates. This provides for a situation where the fourth catalyst material can be arranged for lowering the approach to equilibrium of the gas leaving the structured catalyst by making a pseudo adiabatic equilibration of the relevant reactions.

It should be understood, that a skilled person would readily recognise that any feature described in combination with the structured body and the reactor system for carrying out an endothermic reaction of a feed gas is applicable for this use. The remarks set forth above in relation to the structured body and the reactor system are therefore equally applicable in relation to the use hereof.

DETAILED DESCRIPTION OF THE FIGURES

Throughout the Figures, like reference numbers denote like elements.

FIG. 1a shows a cross section through an embodiment of a heating system 100 according to the invention. The heating system 100 comprises a structured body 10 comprising a first and a second macroscopic structure 5A, 5B (see e.g. FIG. 1b). In the illustrated embodiment, the first and second macroscopic structures 5A, 5B are coaxially arranged. The heating system 100 moreover comprises conductors 40, 40' connected to a power supply (not shown in the Figures) and to the structured body 10, viz. the macroscopic structures. The conductors 40, 40' are led through the wall of a pressure shell 20 housing the structured body and through insulating material 30 on the inner side of the pressure shell, via fittings 50. The conductors 40' are connected to the structured body 10 by conductor contact rails 41.

In an embodiment, the electrical power supply supplies a voltage of 26V and a current of 1200 A. In another embodiment, the electrical power supply supplies a voltage of 5V and a current of 240 A. The current is led through electrical conductors 40, 40' to conductor contact rails 41, and the current runs through the structured body 10 from one conductor contact rail 41, e.g. from the conductor contact rail seen to the left in FIG. 1a, through the first macroscopic structure 5A from the first end to the second end, and through the second macroscopic structure 5B from the second end to the first end and to the other conductor contact rail 41, e.g. the conductor contact rail seen to the right in FIG. 1a. The current can be both alternating current, and e.g. run alternating in both directions, or direct current and run in any of the two directions.

The macroscopic structures 5a, 5B are made of electrically conductive material. Especially preferred is the alloy kanthal consisting of aluminum, iron and chrome. The first and second macroscopic structures may support a ceramic coating, e.g. an oxide, coated onto the structured body 5. The conductors 40, 40' are made in materials like iron, aluminum, nickel, copper or alloys thereof.

During operating, a feed gas enters the heating system 100 from above as indicated by the arrow 11. Heated gas exits the heating system from the bottom thereof as indicated by the arrow 12.

Figure 1B:
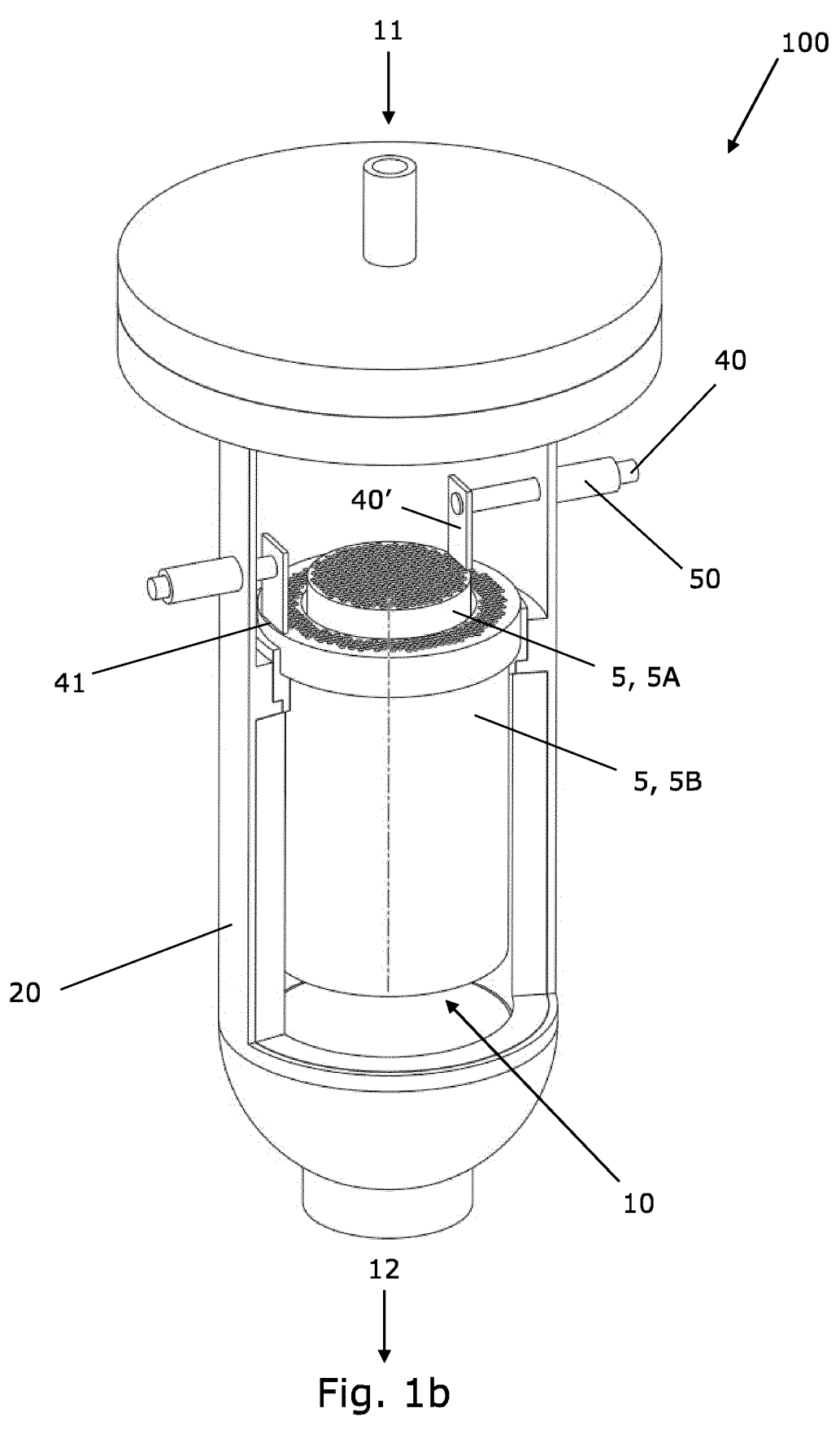
FIG. 1b illustrates the heating system of FIG. 1a with a part of the pressure shell and heat insulation layer removed.
Figure 2:
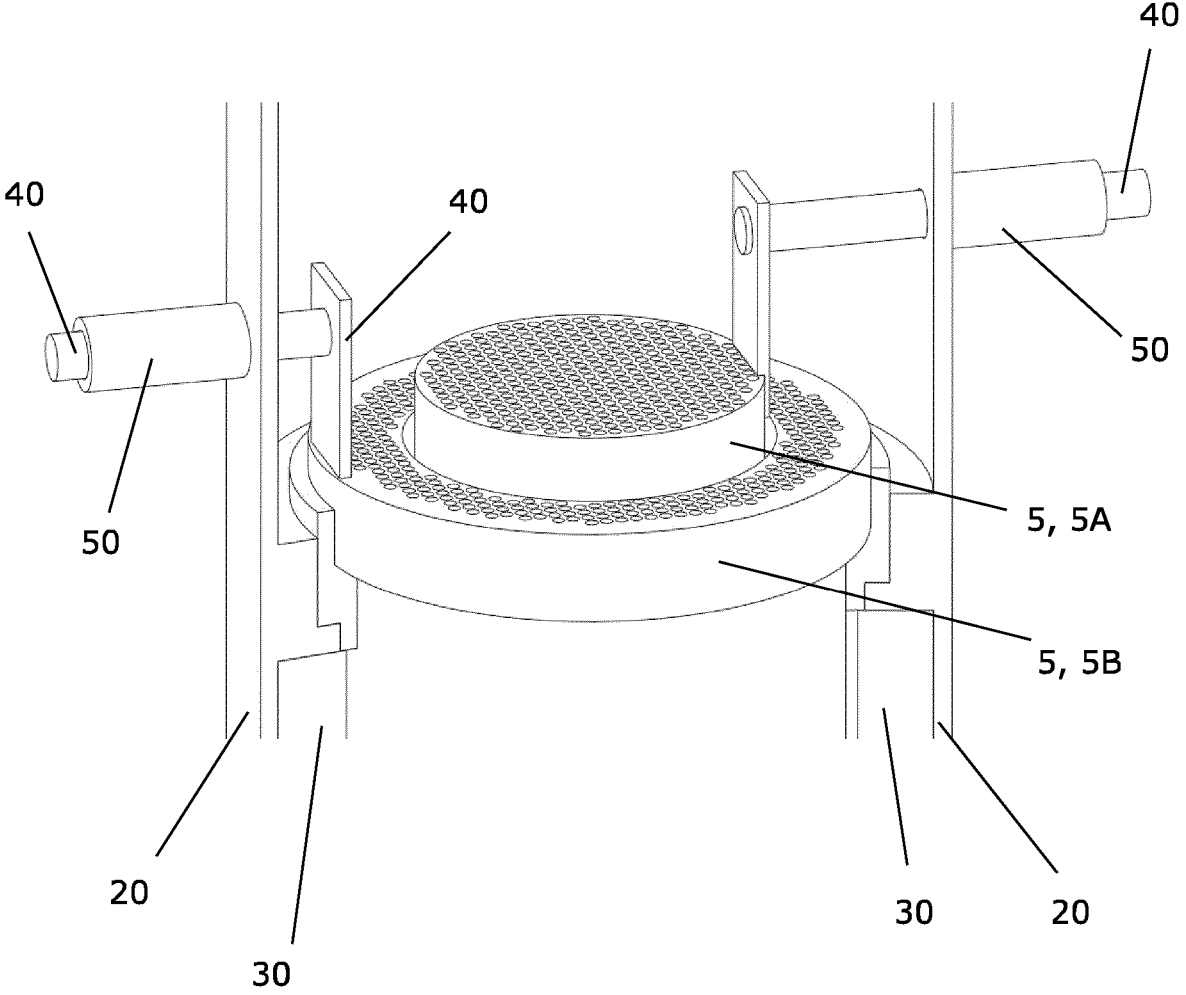
FIG. 2 illustrates an enlarged view of a part of the heating system.

FIG. 1*b* shows the heating system 100 of FIG. 1*a* with a part of the pressure shell 20 and heat insulation 30 layer removed, and FIG. 2 is an enlarged view of a part of the heating system 100. It can be seen that the conductors 40 are led through the walls of the pressure shell in a fitting 50.

In the heating system shown in FIGS. 1*a*, 1*b* and 2, the conductors 40, 40' are led through the wall of a pressure shell 20 housing the structured body and through the insulating material 30 on the inner side of the pressure shell, via fittings 50. Feed gas is inlet into the heating system 100 via an inlet in the upper side of the heating system 100 as shown by the arrow 11, and heated gas exits the heating system 100 via an outlet in the bottom of the heating system 100 as shown by the arrow 12.

In the heating system 100 shown in FIGS. 1*a* to 2, an inert material (not shown in FIGS. 1*a*-2) may be arranged between the lower side of the structured body 10 and the bottom of the pressure shell. Additionally, an inert material may be arranged between the outer sides of the structured body 10 comprising first and second macroscopic structures 5A, 5B and the insulating material 30. Thus, one side of the insulating material 30 may face the inner side of the pressure shell 20 and the other side of the insulating material 30 may face the inert material. The inert materiel may be a ceramic material and may be in the form of pellets. The inert material assists in controlling the pressure drop across the heating system 100 and in controlling the flow of the gas through the heating system 100, so that the gas flows over the surfaces of the structured body 10.

It should be understood that FIG. 1*a*, FIG. 1*b*, and FIG. 2 may as an alternative to the heating system illustrate a reactor system 100. In the alternative configuration, the first and second macroscopic structures 5A, 5B are coated with a ceramic coating impregnated with catalytically active material. During operating, a feed gas enters the reactor system 100 from above as indicated by the arrow 11. A product gas as alternative to the heated gas exits the reactor system from the bottom thereof as indicated by the arrow 12.

FIGS. 3-8 illustrate embodiments of a structured body 10 comprising a first macroscopic structure 5A and a second macroscopic structure 5B. In the embodiments illustrated in FIGS. 3-7, the first and second macroscopic structures are coaxially arranged.

In each of FIG. 3-8, the structured body 10 comprises a first macroscopic structure 5A and a second macroscopic structure 5B, each extending in a longitudinal direction from a first end 14 to a second end 15, where the first end 14 forms an inlet to the macroscopic structure 10 for a feed gas, and where the second end 15 forms an outlet for heated/product gas.

The first and second macroscopic structure 5A, 5B comprise a three-dimensional network structure 5 (see FIG. 3), where the network structure 5 forms flow paths allowing the feed gas to flow from the first end 14 to the second end 15. As illustrated in the left part of FIG. 3, at least a part of the network structure 5 forms a plurality of parallel flow channels 60. It should, however, be understood that at least some of the channels may be non-parallel.

Figure 3:
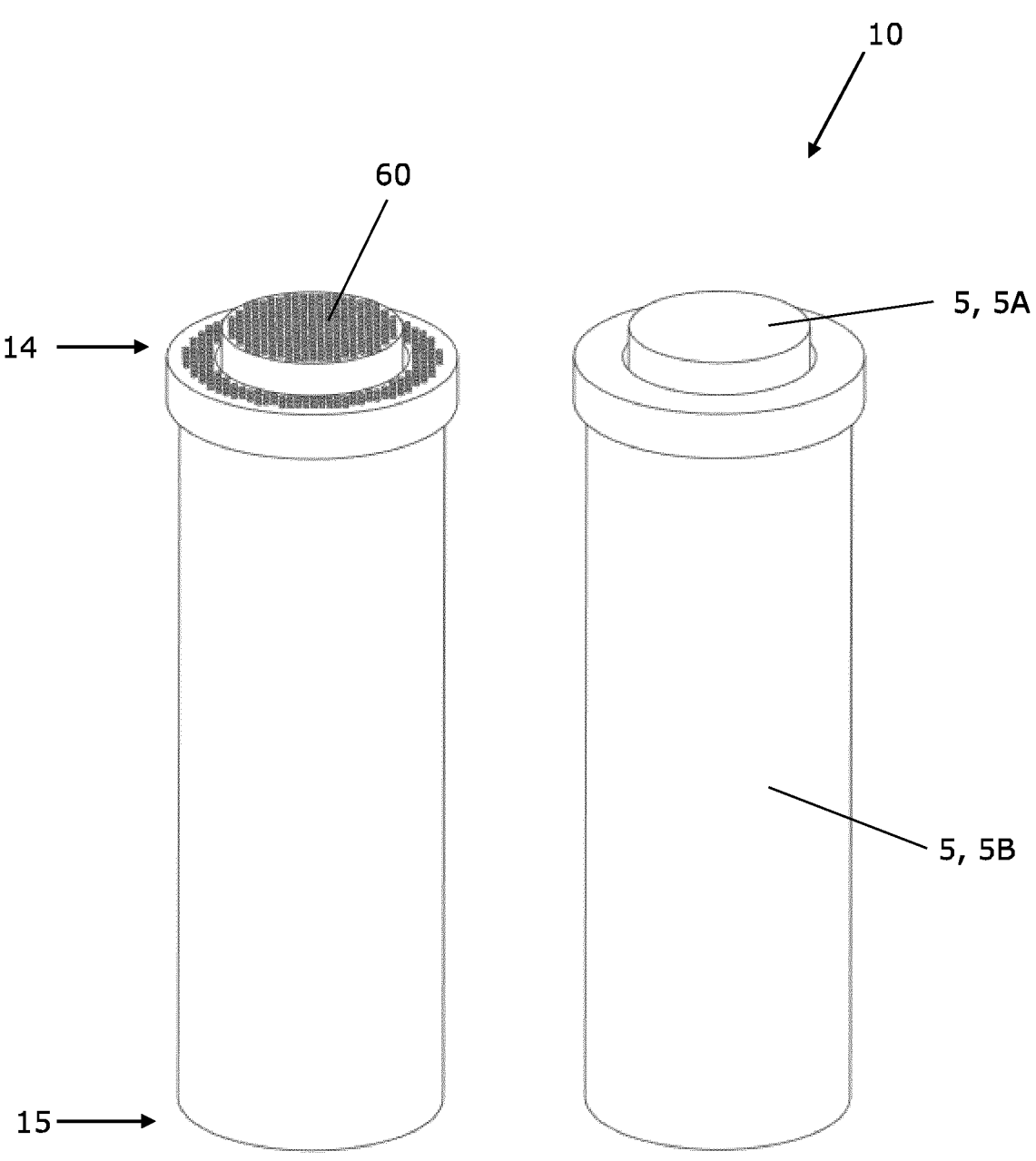
FIG. 3 illustrates an embodiment of a structured body.

The flow channels 60 are only shown in the left side of FIG. 3. In the remaining parts of FIGS. 3-8, the openings, such as flow channels, cut-outs, slit, etc, of the network structure 5 are omitted.

The second macroscopic structure 5B is arranged circumferentially around the first macroscopic structure 5A, and the first and second macroscopic structures 5A, 5B are electrically connected at the second end 15. The structured body 10 is configured to direct an electrical current to run through the first macroscopic structure 5A from the first end 14 to the second end 15, then through the second macroscopic structure 5B from the second end 15 to the first end 14 by electrically connecting the first and second macroscopic structures 5A, 5B at the second end 15.

In the illustrated embodiments, the second macroscopic structure 5B is an elongated structure extending in the longitudinal direction from the first end 14 to the second end 15. The second macroscopic structure 5B is hollow and thereby fully surrounds the first macroscopic structure 5A, whereby an inner surface of the second macroscopic structure 5B faces an outer surface of the first macroscopic structure 5A.

It should be understood, that the second macroscopic structure in an alternative embodiment (not illustrated) may be arranged partly circumferentially around the first macroscopic structure, whereby a part of an inner surface of the second faces a part of an outer surface of the first macroscopic structure.

The first and second macroscopic structures 5A, 5B may be coated with a ceramic coating which may support a catalytically active material.

In FIG. 3 the structured body 10 comprises a first macroscopic structure 5A and a second macroscopic structure 5B, each extending in a longitudinal direction from a first end 14 to a second end 15. The first and second macroscopic structures 5A, 5B each forms a circular outer shape in a cross-section perpendicular to the longitudinal direction.

Figure 4:
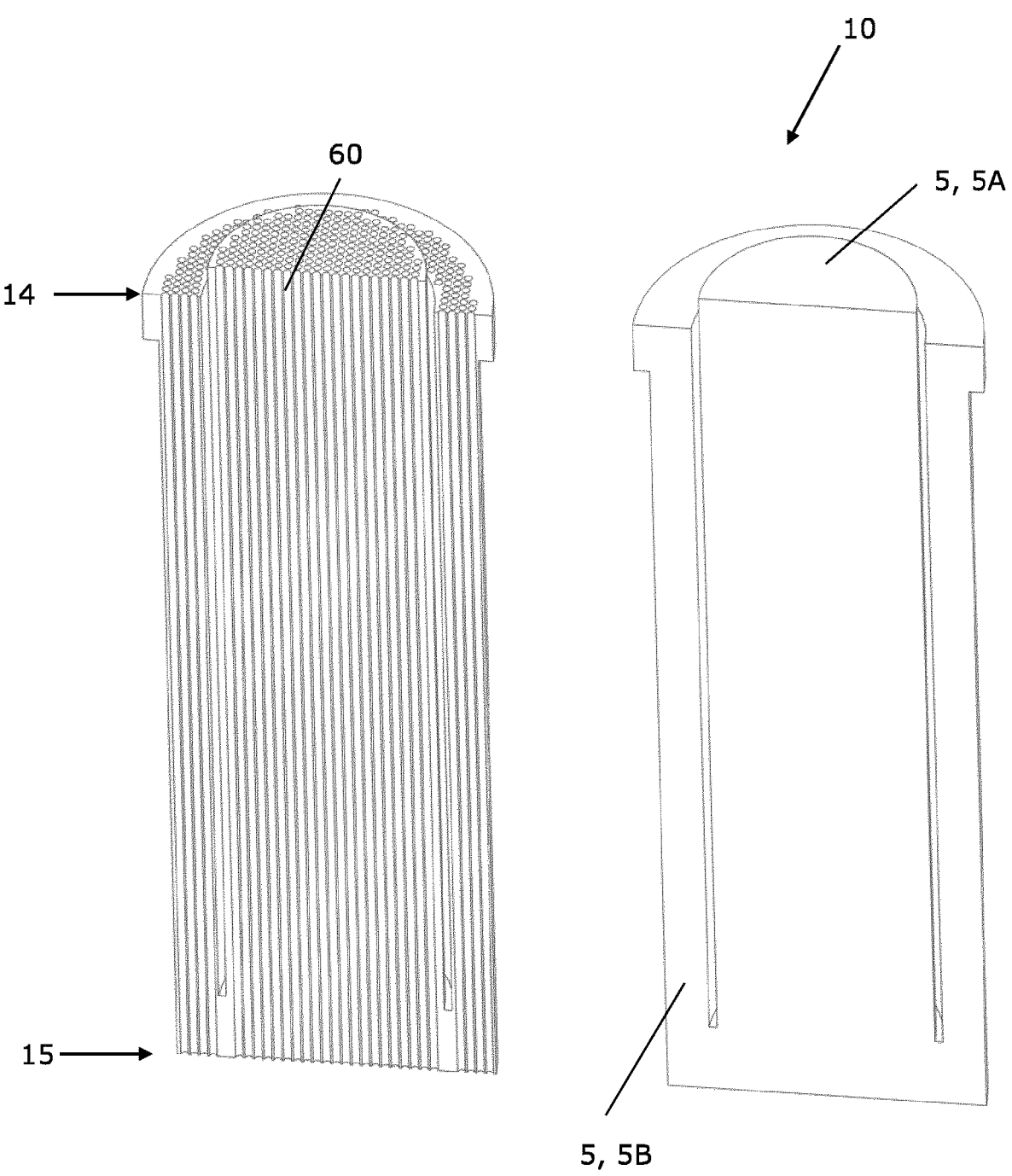
FIG. 4 illustrates a cross-section through the embodiment of a structured body illustrated in FIG. 3.

FIG. 4 illustrates a cross-section through the embodiment of a structured body 10 illustrated in FIG. 3. The flow channels 60 are clearly shown in the cross-section to the left. Furthermore, the cross-sections clearly illustrate that the first and second macroscopic structures 5A, 5B are connected at the second end 15.

Figure 5:
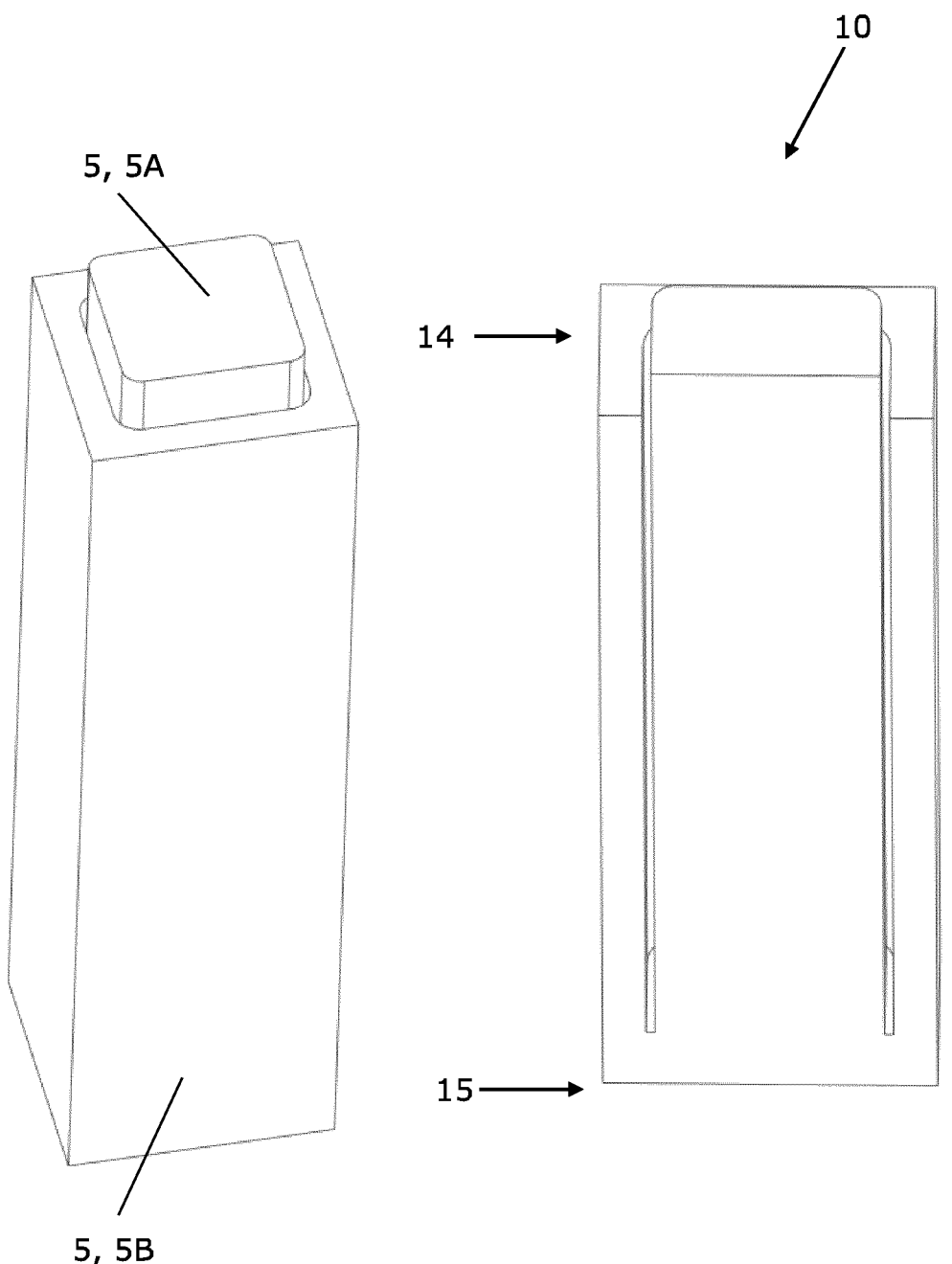
FIG. 5 illustrates an embodiment of a structured body.

In FIG. 5 the structured body 10 comprises a first macroscopic structure 5A and a second macroscopic structure 5B, each extending in a longitudinal direction from a first end 14 to a second end 15. The first and second macroscopic structures 5A, 5B each forms a square shaped outer shape in a cross-section perpendicular to the longitudinal direction. In the cross-section to the right, it is clearly illustrated that the first and second macroscopic structures 5A, 5B are connected at the second end 15.

Figure 6:
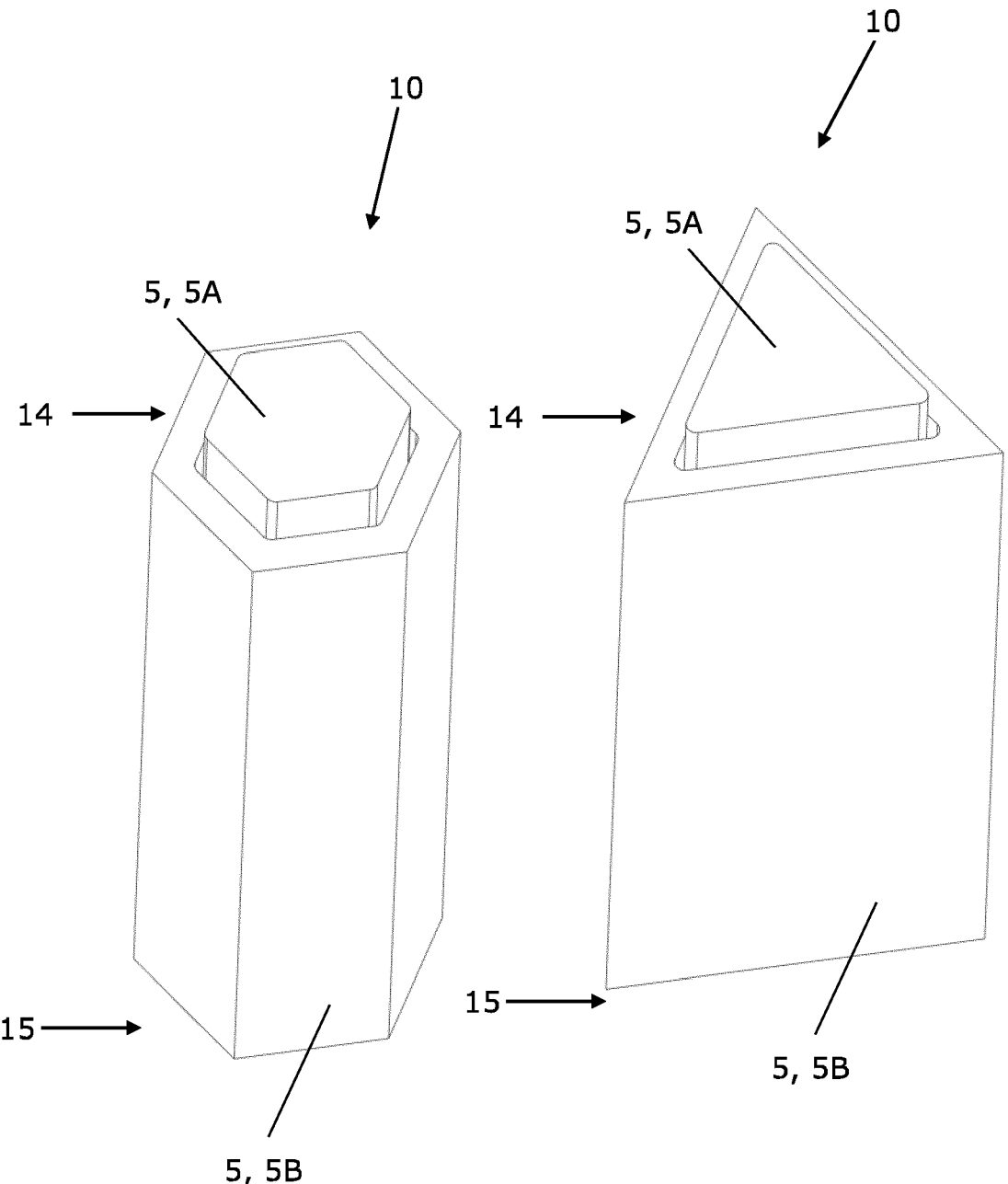
FIG. 6 illustrates an embodiment of a structured body.

FIG. 6 illustrates two different embodiments of a structured body 10, each comprising a first macroscopic structure 5A and a second macroscopic structure 5B which each extends in a longitudinal direction from a first end 14 to a second end 15. The first and second macroscopic structures 5A, 5B to the left each forms a hexagonal shaped outer shape in a cross-section perpendicular to the longitudinal direction, whereas the first and second macroscopic structures 5A, 5B to the right each forms a triangular outer shape in a cross-section perpendicular to the longitudinal direction.

Figure 7:
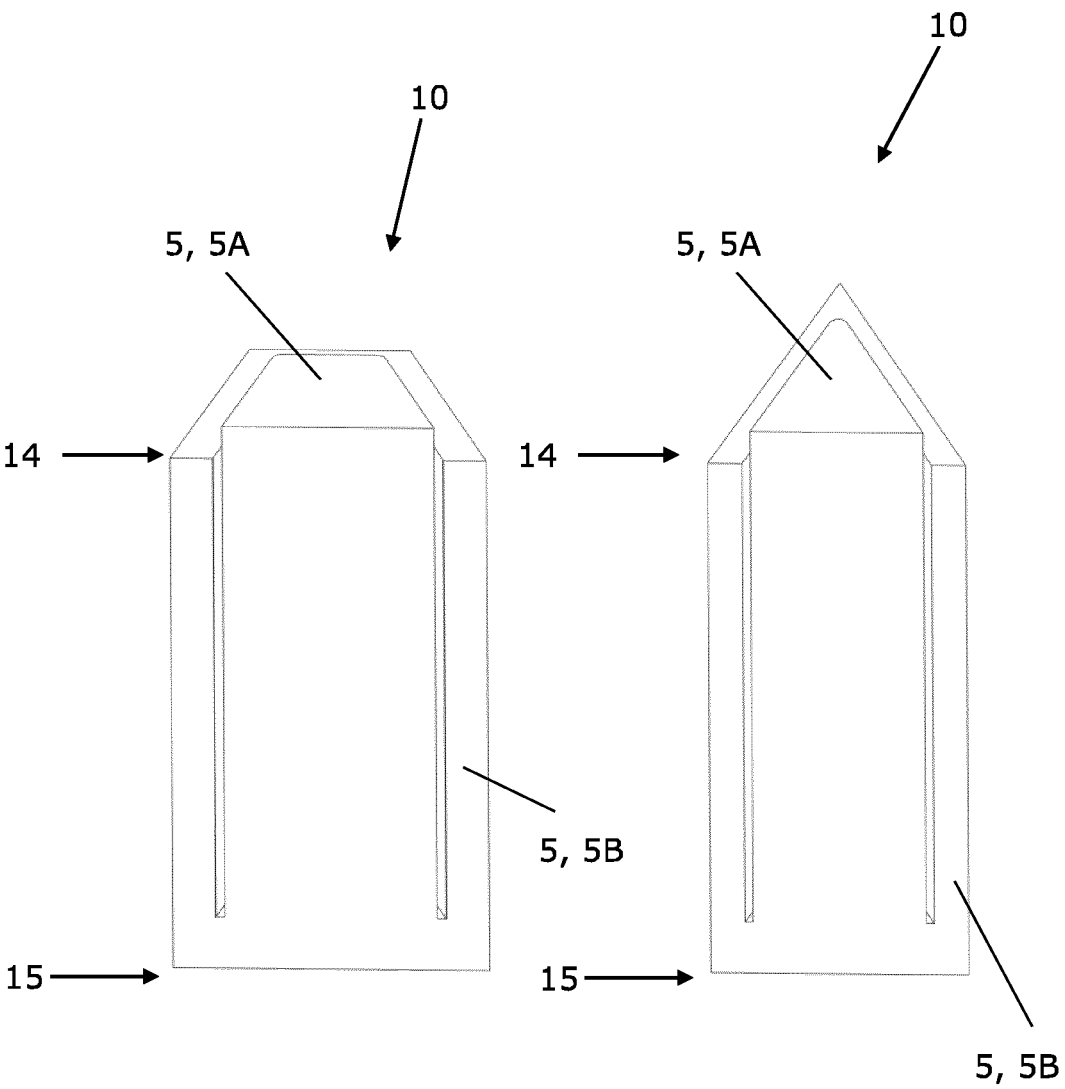
FIG. 7 illustrates an embodiment of a structured body.

FIG. 7 illustrates cross-sections through the embodiments of a structured body 10 illustrated in FIG. 6. The cross-sections clearly illustrate that the first and second macroscopic structures 5A, 5B are connected at the second end 15.

Figure 8:
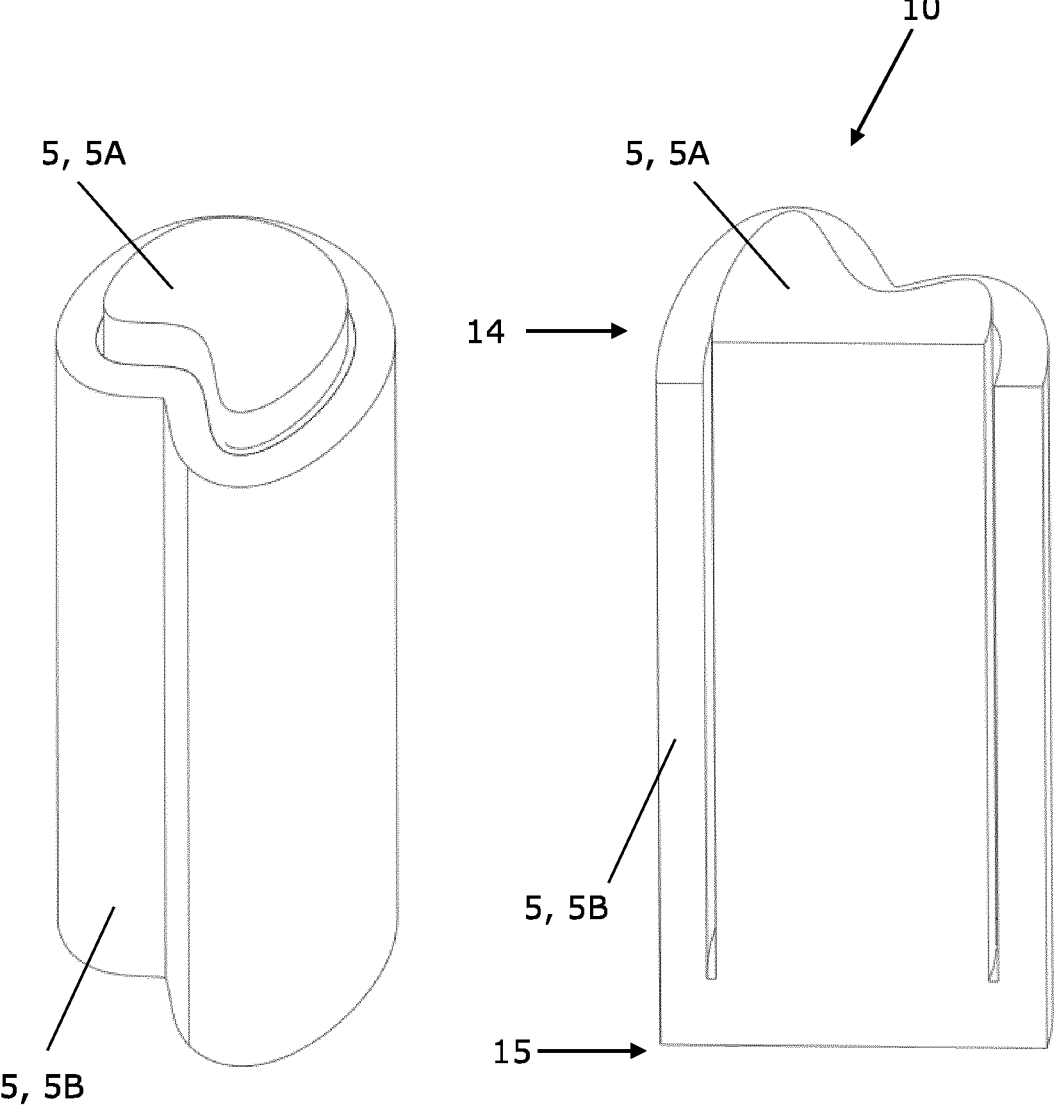
FIG. 8 illustrates an embodiment of a structured body.

In FIG. 8 the structured body 10 comprises a first macroscopic structure 5A and a second macroscopic structure 5B, each extending in a longitudinal direction from a first end 14 to a second end 15. The first and second macroscopic structures 5A, 5B each forms an organic outer shape in a cross-section perpendicular to the longitudinal direction. In the cross-section to the right, it is clearly illustrated that the first and second macroscopic structures 5A, 5B are connected at the second end 15.

The following numbered items are provided:

Item 1. A structured body (10) arranged for heating a feed gas, said structured body (10) comprising a first macroscopic structure (5A) and a second macroscopic structure (5B), each extending in a longitudinal direction from a first end (14) to a second end (15), where said first end (14) forms an inlet to said first and second macroscopic structures (5A, 5B) for said feed gas and said second end (15) forms an outlet for heated gas, said first and second macroscopic structure (5A, 5B) comprising a three-dimensional network structure (5), wherein the network structure (5) forms flow paths (60) allowing the feed gas to flow from said first end (14) to said second end (15), the network structure (5) being formed by a metallic material being electrically conductive, wherein the second macroscopic structure (5B) is arranged at least partly circumferentially around the first macroscopic structure (5A), and wherein the first and second macroscopic structures (5A, 5B) are electrically connected at the second end (15).

Item 2. A structured body (10) according to item 1, wherein the network structure (5) at least partly supports a ceramic coating.

Item 3. A structured body (10) according to item 2, wherein at least a part of the ceramic coating supports a catalytically active material.

Item 4. A structured body (10) according to any of the preceding items, wherein at least a part of the network structure (5) forms a plurality of parallel flow channels (60).

Item 5. A structured body (10) according to any of the preceding items, wherein at least one of the first and second macroscopic structures (5A, 5B) comprises a circumferential wall forming an internal space, the circumferential wall being formed of a metallic material being electrically conductive, and wherein the network structure (5) is arranged in the internal space.

Item 6. A structured body (10) according to any of the preceding items, wherein the second macroscopic structure (5B) is arranged circumferentially around at least 50%, such as at least 60%, such as at least 70%, such as at least 80%, such as at least 90%, such as 100% of an outer surface of the first macroscopic structure (5A).

Item 7. A structured body (10) according to any of the preceding items, further comprising one or more additional macroscopic structures, wherein each additional macroscopic structure is arranged at least partly circumferentially around the macroscopic structure arranged closest to the additional macroscopic structure on its inside side, and wherein neighboring macroscopic structures are electrically connected alternatingly at the first end (14) and at the second end (15).

Item 8. A structured body (10) according to item 7, comprising a first additional macroscopic structure, wherein the first additional macroscopic structure is arranged at least partly circumferentially around the second macroscopic structure (5B), and the second and first additional macroscopic structures are electrically connected at the first end (14).

Item 9. A structured body (10) according to any of the preceding items, wherein an outer surface of the first macroscopic structure (5A) matches an inner surface of the second macroscopic structure (5B).

Item 10. A structured body (10) according to item 9, wherein the outer surface of the first macroscopic structure (5A) in a cross-section transverse to the longitudinal direction is substantially circular.

Item 11. A structured body (10) according to any of the preceding items, wherein the first and second macroscopic structures are arranged substantially co-axially.

Item 12. A structured body (10) according to any of the preceding items, wherein at least one of the first and second macroscopic structures (5A, 5B) is produced by 3D printing.

Item 13. A structured body (10) according to any of the preceding items, wherein the first and second macroscopic structures (5A, 5B) are produced as a single piece by 3D printing.

Item 14. A structured body (10) according to any of the preceding item, further comprising at least a first and a second conductor (40, 40') electrically connected to said first and second macroscopic structures (5A, 5B), respectively, and to an electrical power supply, wherein said electrical power supply is dimensioned to heat at least part of said first and second macroscopic structure (5A, 5B) to a temperature of at least 500° C. by passing an electrical current through said macroscopic structures (5A, 5B), the conductors (40, 40') being connected at positions on the first and second macroscopic structures (5A, 5B) closer to said first end (14) than to said second end (15), the structured body (10) being configured to direct an electrical current to run from the first conductor (40, 40') through the first macroscopic structure (5A) to said second end (15), then through the second macroscopic structure (5B) to the second conductor (40, 40').

Item 15. A structured body (10) according to item 14, wherein the first and second macroscopic structures (5A, 5B) each comprises an attachment section to allow attachment of first and second conductor (40, 40'), respectively, wherein the attachment section is 3D printed in one piece with the first and second macroscopic structures (5A, 5B).

Item 16. A structured body (10) according to any of the preceding items, wherein the network structure (5) comprises a plurality of cut-outs.

Item 17. A structured body (10) according to item 16, wherein the cut-outs are filled with a cut-out material having a lower conductivity than that of the metallic material.

Item 18. A structured body (10) according to item 16 or 17, wherein the cut-out material is a solid material.

Item 19. A structured body (10) according to item 18, wherein the solid material has thermo-mechanical properties being substantially equivalent to thermo-mechanical properties of the metallic material forming the network structure (5).

Item 20. A structured body (10) according to item 16, wherein a first subgroup of cut-outs is filled with air, and wherein a second sub-group of cut-outs is filled with a solid material.

Item 21. A structured body (10) according to any of items 16-20, wherein at least one of the cut-outs has a shape selected from the group consisting of a sphere, a disc, an ellipsoid, a droplet, a spiral, and a polyhedron, such as a box, a pyramid, a diamond, and a rhombus.

Item 22. A structured body (10) according to any of items 16-21, wherein at least two of the cut-outs are of different form and/or shape.

Item 23. A structured body (10) according to any of the preceding items, wherein at least one of the first and second macroscopic structures (5A, 5B) comprises flow guides to ensure flow distribution, wherein the flow guides are 3D printed as one piece with the at least one macroscopic structure (5A, 5B).

Item 24. A structured body (10) according to any of the preceding items, wherein the metallic material is an alloy comprising one or more substances selected from the group consisting of Fe, Cr, Al, Co, Ni, Zr, Cu, Ti, Mn, and Si.

Item 25. A heating system (100) for heating of a feed gas, said heating system (100) comprising:
- a) at least one structured body (10) according to any of items 1-24;
- b) a pressure shell (20) housing said structured body (10), said pressure shell (20) comprising an inlet for letting in said feed gas and an outlet for letting out heated gas, wherein said inlet is positioned so that said feed gas enters said structured body (10) in a first end (14) and said heated gas exits said body from a second end (15); and
- c) a heat insulation layer (30) between said structured body (10) and said pressure shell (20).

Item 26. A heating system (100) according to item 25, further comprising at least two conductors (40, 40') electrically connected to the structured body (10) and to an electrical power supply placed outside said pressure shell (20), wherein said electrical power supply is dimensioned to heat at least part of said structured body (10) to a temperature of at least 400° C. by passing an electrical current through the first and second macroscopic structures (5A, 5B), wherein said at least two conductors (40, 40') are connected to the first macroscopic structure (5A) at a position closer to the first end (14), and wherein the structured body (10) is constructed to direct an electrical current to run from one conductor (40, 40') substantially via the first macroscopic structure (5A) to the second macroscopic structure (5B) and return to a second of said at least two conductors (40, 40').

Item 27. A heating system (100) according to item 26, wherein said electrical power supply is dimensioned to heat at least part of said structured body (10) to a temperature of at least 700° C., preferably at least 900° C., more preferably at least 1000° C.

Item 28. A heating system (100) according to any of items 25-27, wherein the feed gas has essentially the same chemical composition at the inlet as at the outlet of the pressure shell housing.

Item 29. A heating system (100) according to any of items 25-28, wherein the pressure shell (20) has a design pressure of between 2 and 30 bar.

Item 30. A heating system (100) according to any of items 25-28, wherein the pressure shell (20) has a design pressure of between 30 and 200 bar.

Item 31. A heating system (100) according to any of items 25-30, wherein the resistivity of the electrically conductive material is between $10^{-5}$ Ω·m and $10^{-7}$ Ω·m.

Item 32. A heating system (100) according to any items 26-31, where said at least two conductors (40, 40') are led through the pressure shell (20) in a fitting so that the at least two conductors (40, 40') are electrically insulated from the pressure shell (20).

Item 33. A heating system (100) according to any of items 26-32, wherein the connection between the structured body (10) and said at least two conductors (40, 40') is a mechanical connection, a welded connection, a brazed connection or a combination thereof.

Item 34. A heating system (100) according to any of items 26-33, further comprising a control system arranged to control the electrical power supply to ensure that the temperature of the gas exiting the pressure shell (20) lies in a predetermined range.

Item 35. A heating system (100) according to any of items 25-34, wherein the structured body (10) has a ratio between the area equivalent diameter of a horizontal cross section through the structured body (10) and the height of the structured body (10) in the range from 0.1 to 2.0.

Item 36. A heating system (100) according to any of items 25-35, wherein the height of the heating system (100) is between 0.5 and 7 m, more preferably between 0.5 and 3 m.

Item 37. A process for heating a feed gas in a heating system (100) according to any of items 25-36; said process comprising the steps of:
- pressurizing said feed gas,
- supplying said pressurized feed gas to the heating system (100),
- supplying electrical power via electrical conductors (40, 40') connecting an electrical power supply placed outside said pressure shell (20) to said structured body (10), allowing an electrical current to run through said electrically conductive material, thereby heating at least part of the structured body (10),
- heating the feed gas over the structured body (10), and
- outletting a heated gas from the heating system (100).

Item 38. A process according to item 37, wherein said feed gas is pressurised to a pressure between 2 and 30 bar.

Item 39. A process according to item 37, wherein said feed gas is pressurised to a pressure between 30 and 200 bar.

Item 40. A reactor system for carrying out an endothermic reaction of a feed gas, said reactor system comprising:
- a) a structured body (10) according to any of items 3-24;
- b) a pressure shell (20) housing said structured body (10), said pressure shell (20) comprising an inlet for letting in said feed gas and an outlet for letting out product gas, wherein said inlet is positioned so that said feed gas enters said structured body (10) in a first end (14) and said product gas exits said catalyst from a second end (15); and
- c) a heat insulation layer (30) between said structured body (10) and said pressure shell (20).

Item 41. Use of the structured body (10) according to any of items 3-24 or the reactor according to item 40, wherein the endothermic reaction is selected from the group consisting of steam methane reforming, hydrogen cyanide formation, methanol cracking, ammonia cracking, reverse water gas shift and dehydrogenation.

The invention claimed is:

1. A structured body arranged for heating a feed gas, said structured body comprising a first macroscopic structure and a second macroscopic structure, each extending in a longitudinal direction from a first end to a second end, where said first end forms an inlet to said first and second macroscopic structures for said feed gas and said second end forms an outlet for heated gas, said first and second macroscopic structure comprising a three-dimensional network structure, wherein the network structure forms flow paths allowing the feed gas to flow from said first end to said second end, the network structure being formed by a metallic material being electrically conductive, wherein the second macroscopic structure is arranged at least partly circumferentially around the first macroscopic structure, and wherein the first and second macroscopic structures are electrically connected at the second end.

2. A structured body according to claim 1, wherein the network structure at least partly supports a ceramic coating.

3. A structured body according to claim 2, wherein at least a part of the ceramic coating supports a catalytically active material.

4. A structured body according to claim 1, wherein at least a part of the network structure forms a plurality of parallel flow channels.

5. A structured body according to claim 1, wherein at least one of the first and second macroscopic structures comprises a circumferential wall forming an internal space, the circumferential wall being formed of a metallic material being electrically conductive, and wherein the network structure is arranged in the internal space.

6. A structured body according to claim 1, wherein the second macroscopic structure is arranged circumferentially around at least 50% of an outer surface of the first macroscopic structure.

7. A structured body according to claim 1, further comprising one or more additional macroscopic structures, wherein each additional macroscopic structure is arranged at least partly circumferentially around the macroscopic structure arranged closest to the additional macroscopic structure on its inside side, and wherein neighboring macroscopic structures are electrically connected alternatingly at the first end and at the second end.

8. A structured body according to claim 7, comprising a first additional macroscopic structure, wherein the first additional macroscopic structure is arranged at least partly circumferentially around the second macroscopic structure, and wherein the second and first additional macroscopic structures are electrically connected at the first end.

9. A structured body according to claim 1, wherein an outer surface of the first macroscopic structure matches an inner surface of the second macroscopic structure.

10. A structured body according to claim 9, wherein the outer surface of the first macroscopic structure in a cross-section transverse to the longitudinal direction is substantially circular.

11. A structured body according to claim 1, wherein the first and second macroscopic structures are arranged substantially co-axially.

12. A structured body according to claim 1, further comprising at least a first and a second conductor electrically connected to said first and second macroscopic structures, respectively, and to an electrical power supply, wherein said electrical power supply is dimensioned to heat at least part of said first and second macroscopic structure to a temperature of at least 500° C. by passing an electrical current through said macroscopic structures, the conductors being connected at positions on the first and second macroscopic structures closer to said first end than to said second end, the structured body being configured to direct an electrical current to run from the first conductor through the first macroscopic structure to said second end, then through the second macroscopic structure to the second conductor.

13. A structured body according to claim 12, wherein the first and second macroscopic structures each comprises an attachment section to allow attachment of first and second conductor, respectively, wherein the attachment section is 3D printed in one piece with the first and second macroscopic structures.

14. A structured body according to claim 1, wherein at least one of the first and second macroscopic structures comprises flow guides to ensure flow distribution, wherein the flow guides are 3D printed as one piece with the at least one macroscopic structure.

15. A structured body according to claim 1, wherein the metallic material is an alloy comprising one or more substances selected from the group consisting of Fe, Cr, Al, Co, Ni, Zr, Cu, Ti, Mn, and Si.

16. A heating system for heating of a feed gas, said heating system comprising:
a) at least one structured body according to claim 1;
b) a pressure shell housing said structured body, said pressure shell comprising an inlet for letting in said feed gas and an outlet for letting out heated gas, wherein said inlet is positioned so that said feed gas enters said structured body in a first end and said heated gas exits said body from a second end; and
c) a heat insulation layer between said structured body and said pressure shell.

17. A process for heating a feed gas in a heating system according to claim 16; said process comprising the steps of:
pressurizing said feed gas,
supplying said pressurized feed gas to the heating system,
supplying electrical power via electrical conductors connecting an electrical power supply placed outside said pressure shell to said structured body, allowing an electrical current to run through said electrically conductive material, thereby heating at least part of the structured body,
heating the feed gas over the structured body, and
outletting a heated gas from the heating system.

18. A reactor system for carrying out an endothermic reaction of a feed gas, said reactor system comprising:
a) a structured body according to claim 1;
b) a pressure shell housing said structured body, said pressure shell comprising an inlet for letting in said feed gas and an outlet for letting out product gas, wherein said inlet is positioned so that said feed gas enters said structured body in a first end and said product gas exits said catalyst from a second end; and
c) a heat insulation layer between said structured body and said pressure shell.

19. A method comprising using the reactor system according to claim 18, wherein the endothermic reaction is selected from the group consisting of steam methane reforming, hydrogen cyanide formation, methanol cracking, ammonia cracking, reverse water gas shift and dehydrogenation.

* * * * *